US012769374B2

(12) United States Patent
Xiao et al.

(10) Patent No.: US 12,769,374 B2
(45) Date of Patent: Oct. 20, 2026

(54) HINGE MECHANISM AND ELECTRONIC DEVICE

(71) Applicant: Huawei Technologies Co., Ltd., Shenzhen (CN)

(72) Inventors: Zhenlin Xiao, Shenzhen (CN); Kaixu Li, Dongguan (CN); Ding Zhong, Dongguan (CN); Wen Fan, Dongguan (CN); Zhaoen Guo, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 90 days.

(21) Appl. No.: 19/027,270

(22) Filed: Jan. 17, 2025

(65) Prior Publication Data

US 2025/0165042 A1 May 22, 2025

Related U.S. Application Data

(63) Continuation of application No. PCT/CN2023/135447, filed on Nov. 30, 2023.

(30) Foreign Application Priority Data

Dec. 31, 2022 (CN) ......................... 202211739538.5

(51) Int. Cl.
*G06F 1/16* (2006.01)

(52) U.S. Cl.
CPC .......... *G06F 1/1681* (2013.01); *G06F 1/1616* (2013.01); *G06F 1/1652* (2013.01)

(58) Field of Classification Search
CPC .... G06F 1/1681; G06F 1/1616; G06F 1/1652; G09F 9/301; G09F 9/30; H04M 1/022; H04M 1/0268; F16C 11/04; F16C 11/12
See application file for complete search history.

(56) References Cited

U.S. PATENT DOCUMENTS

| | | | | |
|---|---|---|---|---|
| 10,831,242 | B1 * | 11/2020 | He | G06F 1/1652 |
| 11,467,633 | B2 * | 10/2022 | Liao | G06F 1/1641 |
| 11,537,173 | B2 * | 12/2022 | Kim | G06F 1/1652 |
| 11,589,471 | B2 * | 2/2023 | Zhang | G06F 1/1616 |
| 11,681,335 | B1 * | 6/2023 | Hsu | G06F 1/1681 361/679.01 |

(Continued)

FOREIGN PATENT DOCUMENTS

| | | | |
|---|---|---|---|
| CN | 109936648 | A | 6/2019 |
| CN | 113766771 | A | 12/2021 |

(Continued)

*Primary Examiner* — Rockshana D Chowdhury
(74) *Attorney, Agent, or Firm* — Conley Rose, P.C.

(57) ABSTRACT

A hinge mechanism includes a base and a hinge assembly. The hinge assembly includes a first rotating assembly and a second rotating assembly. The first rotating assembly includes a first housing fastening bracket and a first rotating element rotatably connected between the base and the first housing fastening bracket. The second rotating assembly includes a second housing fastening bracket and a second rotating element rotatably connected between the base and the second housing fastening bracket. The first housing fastening bracket has a first support surface, the second housing fastening bracket has a second support surface, and the base has a third support surface.

20 Claims, 14 Drawing Sheets

(56) References Cited

U.S. PATENT DOCUMENTS

| | | | | |
|---|---|---|---|---|
| 11,726,530 | B2 * | 8/2023 | Kang | F16C 11/04 361/679.27 |
| 11,729,932 | B2 * | 8/2023 | Yun | G06F 1/1641 361/807 |
| 11,761,476 | B2 * | 9/2023 | Lin | G06F 1/1681 16/233 |
| 11,778,764 | B2 * | 10/2023 | Zhang | F16C 11/04 361/807 |
| 11,812,568 | B2 * | 11/2023 | Xie | G06F 1/1681 |
| 11,832,405 | B2 * | 11/2023 | Zhang | F16C 11/04 |
| 11,846,998 | B2 * | 12/2023 | Wu | H05K 5/0226 |
| 12,028,470 | B2 * | 7/2024 | Wang | H04M 1/0268 |
| 12,047,521 | B2 * | 7/2024 | Liao | H04M 1/0216 |
| 12,147,276 | B2 * | 11/2024 | Zheng | G06F 1/1616 |
| 12,168,994 | B2 * | 12/2024 | Feng | F16C 11/04 |
| 12,181,934 | B2 * | 12/2024 | Kim | G06F 1/1652 |
| 12,242,301 | B2 * | 3/2025 | Hou | G06F 1/1652 |
| 12,242,309 | B2 * | 3/2025 | Hyun | G06F 1/1647 |
| 12,274,014 | B2 * | 4/2025 | Li | F16C 11/04 |
| 12,342,483 | B2 * | 6/2025 | Ye | H04M 1/022 |
| 12,366,897 | B2 * | 7/2025 | Mao | G06F 1/1652 |
| 12,368,792 | B2 * | 7/2025 | Gao | G06F 1/1652 |
| 12,393,231 | B2 * | 8/2025 | Wang | G06F 1/1652 |
| 12,398,750 | B2 * | 8/2025 | Yu | F16C 11/103 |
| 12,411,525 | B2 * | 9/2025 | Wang | G06F 1/1656 |
| 12,444,327 | B2 * | 10/2025 | Feng | G06F 1/1652 |
| 12,477,675 | B2 * | 11/2025 | Cao | F16C 11/04 |
| 12,481,332 | B2 * | 11/2025 | Sun | G06F 1/1616 |
| 12,500,967 | B2 * | 12/2025 | Park | H04M 1/022 |
| 12,541,231 | B2 * | 2/2026 | Liu | F16C 11/04 |
| 12,547,220 | B2 * | 2/2026 | Zhou | G06F 1/1681 |
| 12,554,290 | B2 * | 2/2026 | Hsu | G06F 1/1681 |
| 12,560,195 | B2 * | 2/2026 | Wang | F16C 11/04 |
| 12,602,076 | B2 * | 4/2026 | Kang | F16C 11/04 |
| 12,608,051 | B2 * | 4/2026 | Zhang | G06F 1/1652 |
| 12,619,289 | B2 * | 5/2026 | Lim | G06F 1/1652 |
| 12,641,738 | B2 * | 5/2026 | Chai | F16C 11/12 |
| 2021/0011513 | A1 * | 1/2021 | Watamura | G06F 1/1652 |
| 2021/0119171 | A1 | 4/2021 | Kim et al. | |
| 2022/0070285 | A1 | 3/2022 | Ge | |
| 2022/0316559 | A1 * | 10/2022 | Jia | G06F 1/1681 |
| 2022/0365570 | A1 * | 11/2022 | Hsu | G06F 1/1652 |
| 2022/0369476 | A1 * | 11/2022 | Kim | G06F 1/1641 |
| 2023/0315163 | A1 * | 10/2023 | Zhang | G06F 1/1626 361/679.27 |
| 2023/0359252 | A1 * | 11/2023 | Kang | G06F 1/1681 |
| 2024/0414862 | A1 * | 12/2024 | Kim | F16C 11/04 |
| 2025/0031330 | A1 * | 1/2025 | Shi | G06F 1/1652 |
| 2025/0165042 | A1 * | 5/2025 | Xiao | G09F 9/301 |
| 2025/0258523 | A1 * | 8/2025 | Lin | G06F 1/1681 |
| 2026/0006733 | A1 * | 1/2026 | Chai | F16C 11/12 |

FOREIGN PATENT DOCUMENTS

| | | | |
|---|---|---|---|
| CN | 114584638 | A | 6/2022 |
| CN | 114697417 | A | 7/2022 |
| CN | 115190194 | A | 10/2022 |

* cited by examiner

HINGE MECHANISM AND ELECTRONIC DEVICE

CROSS-REFERENCE TO RELATED APPLICATIONS

This is a continuation of International Patent Application No. PCT/CN2023/135447 filed on Nov. 30, 2023, which claims priority to Chinese Patent Application No. 202211739538.5 filed on Dec. 31, 2022. The disclosures of the aforementioned applications are hereby incorporated by reference in their entireties.

TECHNICAL FIELD

This application relates to the field of electronic device technologies, and in particular, to a hinge mechanism and an electronic device.

BACKGROUND

As flexible display technologies gradually mature, display manners of electronic devices are driven to change greatly. A mobile phone having a foldable flexible display, a tablet computer having a foldable flexible display, a wearable electronic device having a foldable flexible display, and the like are an important evolution direction of intelligent electronic devices in the future.

A hinge mechanism, as an important component for implementing a folding function of a foldable electronic device, has a feature of continuous foldability. The hinge mechanism may be configured to change a folding state of the electronic device, and may further provide sufficient support force for a flexible display of the electronic device in different folding states. However, because existing hinge mechanisms are complex in structure and mostly have chain structures, the flexible display is prone to pulling and compression, affecting reliability of an entire structure of the electronic device.

SUMMARY

This application provides a hinge mechanism and an electronic device, so that good support is provided for a flexible display when the hinge mechanism is folded or unfolded, to avoid pulling or arching of the flexible display.

According to a first aspect, this application provides a hinge mechanism. The hinge mechanism may be used in a foldable electronic device, and a flexible display of the electronic device is connected to one side of the hinge mechanism. Further, the hinge mechanism includes a base and at least one hinge assembly. The hinge assembly may include a first rotating assembly and a second rotating assembly. The first rotating assembly and the second rotating assembly are disposed opposite to each other on two sides of the base. The first rotating assembly includes a first rotating element and a first housing fastening bracket. The first rotating element is located between the base and the first housing fastening bracket and is rotatably connected to the base and the first housing fastening bracket separately. The second rotating assembly includes a second rotating element and a second housing fastening bracket. The second rotating element is located between the base and the second housing fastening bracket and is rotatably connected to the base and the second housing fastening bracket separately. A side that is of the first housing fastening bracket and that faces the flexible display has a first support surface, a side that is of the second housing fastening bracket and that faces the flexible display has a second support surface, a side that is of the base and that faces the flexible display has a third support surface, and the first support surface, the second support surface, and the third support surface are separately connected to the flexible display.

When the hinge mechanism is in a flattened state, the first support surface, the second support surface, and the third support surface may form a flat support surface for supporting the flexible display, to avoid depression of the flexible display. When the hinge mechanism is in a folded state, the first support surface, the third support surface, and the second support surface may form a U-shaped support surface for supporting the flexible display, to avoid arching of the flexible display. In this way, when the hinge mechanism is folded or unfolded, the hinge mechanism can provide good support for the flexible display, thereby improving structural reliability of the electronic device.

In the hinge mechanism, the first housing fastening bracket rotates relative to the base by using the first rotating element. The first rotating element may further include a first arc-shaped rotating block and a second arc-shaped rotating block that are fastened to each other. Both a concave surface of the first arc-shaped rotating block and a concave surface of the second arc-shaped rotating block may be provided toward one side of the flexible display. A first arc-shaped guiding groove is provided on a side that is of the base and that faces the first rotating element. A second arc-shaped guiding groove is provided on a side that is of the first housing fastening bracket and that faces the first rotating element. Further, the first arc-shaped rotating block is accommodated in the first arc-shaped guiding groove, and slides in the first arc-shaped guiding groove to implement a rotatable connection between the first rotating element and the base, and the second arc-shaped rotating block is accommodated in the second arc-shaped guiding groove, and slides in the second arc-shaped guiding groove to implement a rotatable connection between the first rotating element and the first housing fastening bracket. The first arc-shaped rotating block and the first arc-shaped guiding groove have a first rotation center, the second arc-shaped rotating block and the second arc-shaped guiding groove have a second rotation center, and the first rotation center and the second rotation center do not overlap. Therefore, an axial phase difference between the first housing fastening bracket and the first rotating element can be implemented during rotation of the hinge mechanism, so that the first housing fastening bracket and the first rotating element telescopically move relative to the base.

Correspondingly, the second housing fastening bracket rotates relative to the base by using the second rotating element. The second rotating element may further include a third arc-shaped rotating block and a fourth arc-shaped rotating block that are fastened to each other. Both a concave surface of the third arc-shaped rotating block and a concave surface of the fourth arc-shaped rotating block are provided toward one side of the flexible display. A third arc-shaped guiding groove is provided on a side that is of the base and that faces the second rotating element. A fourth arc-shaped guiding groove is provided on a side that is of the second housing fastening bracket and that faces the second rotating element. Further, the third arc-shaped rotating block is accommodated in the third arc-shaped guiding groove, and slides in the third arc-shaped guiding groove to implement a rotatable connection between the second rotating element and the base, and the fourth arc-shaped rotating block is accommodated in the fourth arc-shaped guiding groove, and slides in the fourth arc-shaped guiding groove to implement a rotatable connection between the second rotating element and the second housing fastening bracket. The third arc-shaped rotating block and the third arc-shaped guiding groove have a third rotation center, the fourth arc-shaped rotating block and the fourth arc-shaped guiding groove have a fourth rotation center, and the third rotation center and the fourth rotation center do not overlap. Therefore, an axial phase difference between the second housing fastening bracket and the second rotating element can be implemented during rotation of the hinge mechanism, so that the second housing fastening bracket and the second rotating element can telescopically move relative to the base.

Therefore, the first housing fastening bracket and the first rotating element, and the second housing fastening bracket and the second rotating element may be telescopic relative to the base, so that the hinge mechanism in an unfolded state can stably support the flexible display of the electronic device, and the hinge mechanism in a closed state can form a support structure that meets a bending requirement of the flexible display. This can effectively reduce space occupied by the first rotating assembly and the second rotating assembly in a folding or unfolding process of the hinge mechanism, and is beneficial to implementing a miniaturization design of the hinge mechanism.

When the hinge mechanism is further disposed, in addition to the first housing fastening bracket, the second housing fastening bracket, and the base, the first rotating element and the second rotating element may provide support for the flexible display. Further, the first rotating element may further include a first body. The first arc-shaped rotating block and the second arc-shaped rotating block are disposed on a side that is of the first body and that is away from the flexible display. A side that is of the first body and that faces the flexible display has a first arc-shaped support surface. The first arc-shaped support surface protrudes toward the flexible display. Correspondingly, the second rotating element may further include a second body. The third arc-shaped rotating block and the fourth arc-shaped rotating block are disposed on a side that is of the second body and that is away from the flexible display. A side that is of the second body and that faces the flexible display has a second arc-shaped support surface. The second arc-shaped support surface protrudes toward the flexible display. When the hinge mechanism is in the flattened state, at least a part of the first arc-shaped support surface may be located in the flat support surface and abut against the flexible display, and at least a part of the second arc-shaped support surface may be located in the flat support surface and abut against the flexible display. When the hinge mechanism is in the folded state, the first support surface, the first arc-shaped support surface, the third support surface, the second arc-shaped support surface, and the second support surface form the U-shaped support surface. In this way, when the hinge mechanism is folded or flattened, five support surfaces, namely, the first support surface, the first arc-shaped support surface, the third support surface, the second arc-shaped support surface, and the second support surface, may jointly support the flexible display, to further enhance support for the flexible display.

In some technical solutions, the first support surface, the second support surface, and the third support surface may be planes. Alternatively, in some other technical solutions, the first support surface, the second support surface, and the third support surface may be arc surfaces. For example, in a technical solution, the first support surface may include a first plane and a first arc surface, the first arc surface is provided on a side that is of the first plane and that is close to the first rotating element, and the first arc surface may extend in a direction away from the flexible display. Similarly, the second support surface may include a second plane and a second arc surface, the second arc surface is provided on a side that is of the second plane and that is close to the second rotating element, and the second arc surface may extend in a direction away from the flexible display. Correspondingly, the third support surface may include a third plane, a third arc surface, and a fourth arc surface, and the third arc surface and the fourth arc surface are respectively located on two sides of the third plane. The third arc surface is provided close to the first rotating element, the fourth arc surface is provided close to the second rotating element, and the third arc surface and the fourth arc surface may separately extend in a direction away from the flexible display. In this technical solution, in a process in which the first housing fastening bracket and the second housing fastening bracket are folded or unfolded relative to each other, the first arc surface and the third arc surface may respectively abut against two sides of the first arc-shaped support surface, to implement smooth transition of the first support surface, the first arc-shaped support surface, and the third support surface, and the second arc surface and the fourth arc surface respectively abut against two sides of the second arc-shaped support surface, to implement smooth transition of the second support surface, the second arc-shaped support surface, and the third support surface. When the hinge mechanism is in the flattened state, the first plane, at least a part of the first arc-shaped support surface, the second plane, at least a part of the second arc-shaped support surface, and the third plane form the flat support surface, and when the hinge mechanism is in the folded state, the first plane, the first arc surface, the first arc-shaped support surface, the third arc surface, the third plane, the fourth arc surface, the second arc-shaped support surface, the second arc surface, and the second plane form the U-shaped support surface.

In some technical solutions of this application, the hinge assembly may further include a first sliding limiting assembly and a second sliding limiting assembly, to restrict rotation directions and rotation angles of the first housing fastening bracket and the second housing fastening bracket relative to the base. Further, the first sliding limiting assembly is connected between the first housing fastening bracket and the base, and the second sliding limiting assembly is connected between the second housing fastening bracket and the base. The first sliding limiting assembly includes a first limiting gear and a first limiting gear swing rod. The first limiting gear includes a first limiting gear shaft disposed on the base and a first limiting gear body sleeved on the first limiting gear shaft. The first limiting gear swing rod includes a first limiting sliding block and a first limiting gear part. The first housing fastening bracket is provided with a first limiting chute extending in a direction away from the base. The first limiting sliding block is accommodated in the first limiting chute. The first limiting gear part is disposed at an end that is of the first limiting sliding block and that faces the base, and meshes with the first limiting gear body. The first limiting sliding block slides in the first limiting chute to restrict a rotation direction of the first rotating assembly relative to the base. The second sliding limiting assembly includes a second limiting gear and a second limiting gear swing rod. The second limiting gear includes a second limiting gear shaft disposed on the base and a second limiting gear body sleeved on the second limiting gear shaft. The second limiting gear body meshes with the first limiting gear body. The second limiting gear swing rod includes a second limiting sliding block and a second limiting gear part. The second housing fastening bracket is provided with a second limiting chute extending in a direction away from the base. The second limiting sliding block is accommodated in the second limiting chute. The second limiting gear part is disposed at an end that is of the second limiting sliding block and that faces the base, and meshes with the second limiting gear body. The second limiting sliding block slides in the second limiting chute to restrict a rotation direction of the second rotating assembly relative to the base. In a process in which the first housing fastening bracket and the second housing fastening bracket are folded or unfolded relative to each other, the first limiting gear body and the second limiting gear body can rotate synchronously, so that the first limiting gear swing rod and the second limiting gear swing rod are synchronously driven to slide along the first limiting chute and the second limiting chute respectively, to implement synchronous opening and closing of the hinge mechanism, and make the hinge mechanism more stable in a folding or unfolding process.

In some optional technical solutions, the hinge assembly may further include a first damping assembly and a second damping assembly. The first damping assembly includes a first spring, a first moving shaft, and a first roller. One end of the first spring is fastened to the first housing fastening bracket, and the other end is connected to the first moving shaft. The first roller is sleeved on the first moving shaft and may rotate around the first moving shaft. The first limiting sliding block is provided with a first limiting protrusion, and the first limiting protrusion abuts against a peripheral side of the first roller. When the first limiting sliding block slides in the first limiting chute, the first limiting protrusion pushes the first roller to rotate, and drives the first moving shaft to compress the first spring, so that the first spring generates first elastic force, and sliding of the first limiting sliding block is dampened by using the first elastic force, to provide a buffer function for sliding of the first limiting sliding block, so as to cause the first limiting sliding block to slide more smoothly in the first limiting chute. Similarly, the second damping assembly includes a second spring, a second moving shaft, and a second roller. One end of the second spring is fastened to the second housing fastening bracket, and the other end is connected to the second moving shaft. The second roller is sleeved on the second moving shaft and may rotate around the second moving shaft. The second limiting sliding block is provided with a second limiting protrusion, and the second limiting protrusion abuts against a peripheral side of the second roller. When the second limiting sliding block slides in the second limiting chute, the second limiting protrusion pushes the second roller to rotate, and drives the second moving shaft to compress the second spring, so that the second spring generates second elastic force, and sliding of the second limiting sliding block is dampened by using the second elastic force, to provide a buffer function for sliding of the second limiting sliding block, so as to cause the second limiting sliding block to slide more smoothly in the second limiting chute.

In some other optional technical solutions, the damping assembly may be alternatively implemented by using another structure. Further, the hinge assembly may further include a third damping assembly and a fourth damping assembly. The third damping assembly includes a third spring, a first damping cam, and a second damping cam. The third spring is disposed on the base. The first damping cam is disposed on one end of the third spring. The second damping cam is fastened to the first limiting gear part and meshes with the first damping cam. When the first limiting sliding block slides in the first limiting chute, the second damping cam pushes the first damping cam and compresses the third spring, so that the third spring generates third elastic force, and sliding of the first limiting sliding block is dampened by using the third elastic force, to provide a buffer function for sliding of the first limiting sliding block. Similarly, the fourth damping assembly includes a fourth spring, a third damping cam, and a fourth damping cam. The fourth spring is disposed on the base. The third damping cam is disposed on one end of the fourth spring. The fourth damping cam is fastened to the second limiting gear part and meshes with the third damping cam. When the second limiting sliding block slides in the second limiting chute, the fourth damping cam pushes the third damping cam and compresses the fourth spring, so that the fourth spring generates fourth elastic force, and sliding of the second limiting sliding block is dampened by using the fourth elastic force, to provide a buffer function for sliding of the second limiting sliding block.

In this application, in some optional technical solutions, the hinge mechanism may further include a first flexible backplane, a first backplane support assembly, and a second backplane support assembly. The first flexible backplane shields the base and the hinge assembly by using the first backplane support assembly and the second backplane support assembly. Further, the first backplane support assembly includes a first sliding block and a fifth arc-shaped rotating block that are fastened to each other, where the first sliding block is disposed close to the first housing fastening bracket, the fifth arc-shaped rotating block is disposed close to the base, and a concave surface of the fifth arc-shaped rotating block is provided away from the flexible display. The second backplane support assembly includes a second sliding block and a sixth arc-shaped rotating block that are fastened to each other, where the second sliding block is disposed close to the second housing fastening bracket, the sixth arc-shaped rotating block is disposed close to the base, and a concave surface of the sixth arc-shaped rotating block is provided away from the flexible display. In addition, a first guiding groove is provided on a side that is of the first housing fastening bracket and that is close to the first backplane support assembly, an end that is of the first guiding groove and that is away from the base extends along the flexible display, a second guiding groove is provided on a side that is of the second housing fastening bracket and that is close to the second backplane support assembly, an end that is of the second guiding groove and that is away from the base extends along the flexible display, a fifth arc-shaped guiding groove is provided on a side that is of the base and that is close to the first backplane support assembly, and a sixth arc-shaped guiding groove is provided on a side that is of the base and that is close to the second backplane support assembly. In this technical solution, the first sliding block is accommodated in the first guiding groove, and slides in the first guiding groove to implement a sliding connection between the first backplane support assembly and the first housing fastening bracket. The fifth arc-shaped rotating block is accommodated in the fifth arc-shaped guiding groove, and slides in the fifth arc-shaped guiding groove to implement a rotatable connection between the first backplane support assembly and the base. The second sliding block is accommodated in the second guiding groove, and slides in the second guiding groove to implement a sliding connection between the second backplane support assembly and the second housing fastening bracket. The sixth arc-shaped rotating block is accommodated in the sixth arc-shaped guiding groove, and slides in the sixth arc-shaped guiding groove to implement a rotatable connection between the second backplane support assembly and the base. The first flexible backplane is disposed between the first housing fastening bracket and the second housing fastening bracket, and covers the base, the first rotating assembly, the second rotating assembly, the first backplane support assembly, and the second backplane support assembly. The first backplane support assembly and the second backplane support assembly are separately connected to the first flexible backplane. When the hinge mechanism is in the flattened state, the first flexible backplane, a surface of a side that is of the first housing fastening bracket and that is away from the flexible display, and a surface of a side that is of the second housing fastening bracket and that is away from the flexible display may jointly form an appearance surface, to implement appearance integrity and integrity. A first accommodating cavity is further provided on a side that is of the first housing fastening bracket and that is close to the first flexible backplane, and a second accommodating cavity is provided on a side that is of the second housing fastening bracket and that is close to the first flexible backplane. Therefore, in a process in which the first housing fastening bracket and the second housing fastening bracket are folded relative to each other, the first sliding block slides in the first guiding groove in a direction away from the base, the fifth arc-shaped rotating block slides in the fifth arc-shaped guiding groove in a direction away from the base, the second sliding block slides in the second guiding groove in a direction away from the base, and the sixth arc-shaped rotating block slides in the sixth arc-shaped guiding groove in a direction away from the base, so that the first flexible backplane is folded and two ends of the first flexible backplane may respectively extend into the first accommodating cavity and the second accommodating cavity, to accommodate the first flexible backplane.

In some technical solutions, the first backplane support assembly may further include a first support plate. The first sliding block and the fifth arc-shaped rotating block are disposed on a side that is of the first support plate and that faces the flexible display. The first flexible backplane is connected to a side that is of the first support plate and that is away from the flexible display. The second backplane support assembly may further include a second support plate. The second sliding block and the sixth arc-shaped rotating block are disposed on a side that is of the second support plate and that faces the flexible display. The first flexible backplane is connected to a side that is of the second support plate and that is away from the flexible display. When the first flexible backplane is bent, a surface that is of the first flexible backplane and that is away from the base is closer to a curvature center than a surface that is of the first flexible backplane and that faces the base, so that pulling force exerted on the surface that is of the first flexible backplane and that faces the base is greater than pulling force exerted on the surface that is of the first flexible backplane and that is away from the base. A blind hole structure is provided on a surface of a side that is of the first flexible backplane and that faces the flexible display. The blind hole structure is located between the first support plate and the second support plate, so that surface stress distribution of the first flexible backplane can be improved, and bending resistance of the first flexible backplane can be improved.

In some other optional technical solutions, the backplane support assembly may alternatively be implemented in another manner. Further, the hinge mechanism may further include a second flexible backplane, a third backplane support assembly, and a fourth backplane support assembly. The third backplane support assembly includes a third rotating gear and a third rotating gear swing rod, where the third rotating gear includes a third rotating gear shaft disposed on the base and a third rotating gear body sleeved on the third rotating gear shaft. The third rotating gear swing rod includes a third swing rod sliding block and a third swing rod gear part. A third guiding groove is provided on a side that is of the first housing fastening bracket and that faces the third backplane support assembly, and an end that is of the third guiding groove and that is away from the base extends along the flexible display. The third swing rod sliding block is accommodated in the third guiding groove. The third swing rod gear part is disposed at an end that is of the third swing rod sliding block and that faces the base, and meshes with the third rotating gear body. The fourth backplane support assembly includes a fourth rotating gear and a fourth rotating gear swing rod, where the fourth rotating gear includes a fourth rotating gear shaft disposed on the base and a fourth rotating gear body sleeved on the fourth rotating gear shaft. The fourth rotating gear swing rod includes a fourth swing rod sliding block and a fourth swing rod gear part. A fourth guiding groove is provided on a side that is of the second housing fastening bracket and that faces the fourth backplane support assembly, and an end that is of the fourth guiding groove and that is away from the base extends along the flexible display. The fourth swing rod sliding block is accommodated in the fourth guiding groove. The fourth swing rod gear part is disposed at an end that is of the fourth swing rod sliding block and that faces the base, and meshes with the fourth rotating gear body. The second flexible backplane is disposed between the first housing fastening bracket and the second housing fastening bracket, and covers the base, the first rotating assembly, the second rotating assembly, the third backplane support assembly, and the fourth backplane support assembly. The third backplane support assembly and the fourth backplane support assembly are separately connected to the second flexible backplane. A third accommodating cavity is further provided on a side that is of the first housing fastening bracket and that is close to the second flexible backplane, and a fourth accommodating cavity is provided on a side that is of the second housing fastening bracket and that is close to the second flexible backplane. In a process in which the first housing fastening bracket and the second housing fastening bracket are folded relative to each other, the third swing rod sliding block slides in the third guiding groove in a direction away from the base, and the fourth swing rod sliding block slides in the fourth guiding groove in a direction away from the base, so that the second flexible backplane is folded, and two ends of the second flexible backplane respectively extend into the third accommodating cavity and the fourth accommodating cavity.

According to a second aspect, this application provides an electronic device. The electronic device includes a flexible display and the hinge mechanism in the first aspect. Further, the flexible display is disposed on one side of the hinge mechanism, and is connected to the first support surface, the second support surface, and the third support surface.

When the electronic device is folded or unfolded, because a first rotation center and a second rotation center of the hinge mechanism do not overlap, an axial phase difference between a housing fastening bracket and a rotating element disposed on a same side may be implemented in a rotation process of the electronic device, so that the housing fastening bracket and the rotating element telescopically move relative to the base. In this way, the hinge mechanism in an unfolded state can smoothly support the flexible display, and the hinge mechanism in a closed state can form a support structure that meets a bending requirement of the flexible display, to avoid pulling or arching of the flexible display, and therefore improve structural reliability of the electronic device. When the electronic device is in a flattened state, the first support surface, the second support surface, and the third support surface may form a flat support surface for supporting the flexible display, to avoid depression of the flexible display. When the electronic device is in a folded state, the first support surface, the third support surface, and the second support surface may form a U-shaped support surface for supporting the flexible display, to avoid arching of the flexible display. In this way, when the electronic device is folded or unfolded, the hinge mechanism can provide good support for the flexible display, thereby improving structural reliability of the electronic device.

REFERENCE NUMERALS

Figure 1:
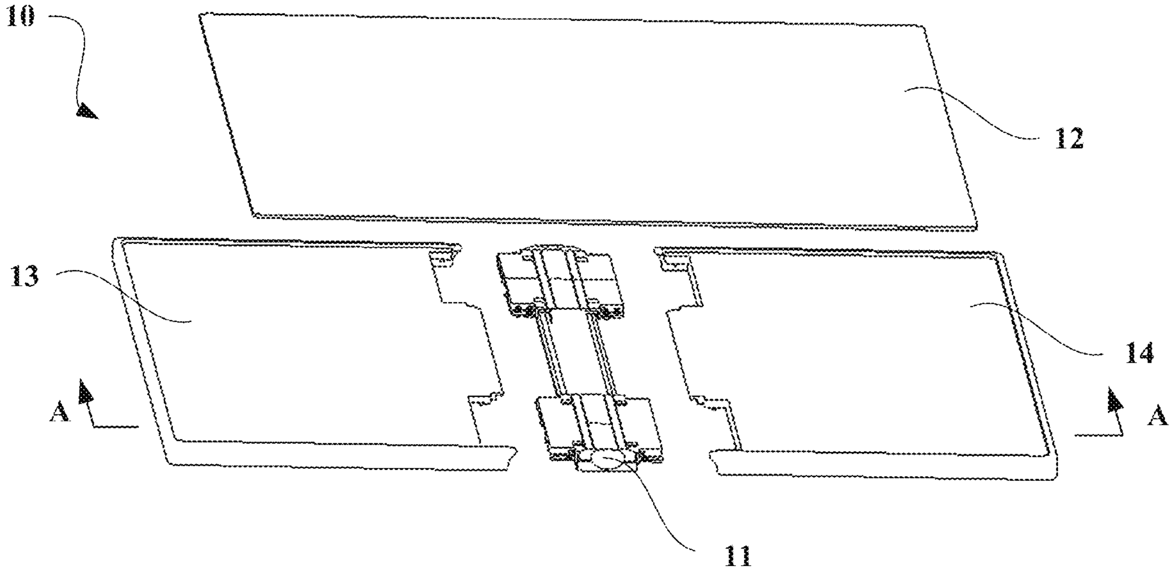
FIG. 1 is a three-dimensional assembly diagram of an electronic device in an unfolded state according to an embodiment of this application.

- 10: electronic device; 11: hinge mechanism; 12: flexible display;
- 13: first housing; 14: second housing; 110: base;
- 1101*a*: first arc-shaped guiding groove; 1102*a*: fifth arc-shaped guiding groove; 1102*b*: sixth arc-shaped guiding groove;
- 111: hinge assembly; 112*a*: first rotating assembly; 112*b*: second rotating assembly;
- 113*a*: first rotating element; 113*b*: second rotating element; 1131*a*: first body;
- 1132*a*: first arc-shaped rotating block; 1133*a*: second arc-shaped rotating block; 114*a*: first housing fastening bracket;
- 114*b*: second housing fastening bracket; 1141*a*: second arc-shaped guiding groove;
- 1142*a*: first limiting chute;
- 1142*b*: second limiting chute; 1143*a*: first guiding groove; 1143*b*: second guiding groove;
- 1144*a*: first accommodating cavity; 1144*b*: second accommodating cavity; 1145*a*: third guiding groove;
- 1145*b*: fourth guiding groove; 1146*a*: third accommodating cavity; 1146*b*: fourth accommodating cavity;
- 115*a*: first sliding limiting assembly; 115*b*: second sliding limiting assembly; 1151*a*: first limiting gear;
- 1151*b*: second limiting gear; 1152*a*: first limiting gear swing rod; 1152*b*: second limiting gear swing rod;
- 1153*a*: first limiting gear shaft; 1153*b*: second limiting gear shaft; 1154*a*: first limiting gear body;
- 1154*b*: second limiting gear body; 1155*a*: first limiting sliding block; 1155*b*: second limiting sliding block;
- 1156*a*: first limiting gear part; 1156*b*: second limiting gear part; 1157*a*: first limiting protrusion;
- 1157*b*: second limiting protrusion; 116*a*: first damping assembly; 116*b*: second damping assembly;
- 1161*a*: first spring; 1161*b*: second spring; 1162*a*: first moving shaft;
- 1162*b*: second moving shaft; 1163*a*: first roller; 1163*b*: second roller;
- 117*a*: third damping assembly; 117*b*: fourth damping assembly; 1171*a*: third spring;
- 1171*b*: fourth spring; 1172*a*: first damping cam; 1172*b*: third damping cam;
- 1173*a*: second damping cam; 1173*b*: fourth damping cam; 118*a*: first backplane support assembly;
- 118*b*: second backplane support assembly; 118*c*: third backplane support assembly; 118*d*: fourth backplane support assembly;
- 1181*a*: first support plate; 1181*b*: second support plate; 1182*a*: fifth arc-shaped rotating block;
- 1182*b*: sixth arc-shaped rotating block; 1183*a*: first sliding block; 1183*b*: second sliding block;
- 1184*a*: third rotating gear; 1184*b*: fourth rotating gear; 1185*a*: third rotating gear swing rod;
- 1185*b*: fourth rotating gear swing rod; 1186*a*: third rotating gear shaft; 1186*b*: fourth rotating gear shaft;
- 1187*a*: third rotating gear body; 1187*b*: fourth rotating gear body; 1188*a*: third swing rod sliding block;
- 1188*b*: fourth swing rod sliding block; 1189*a*: third swing rod gear part; 1189*b*: fourth swing rod gear part;
- 119: flexible backplane; 1191: blind hole structure.

DESCRIPTION OF EMBODIMENTS

To make the objectives, technical solutions, and advantages of this application clearer, the following further describes this application in detail with reference to the accompanying drawings.

Figure 2:
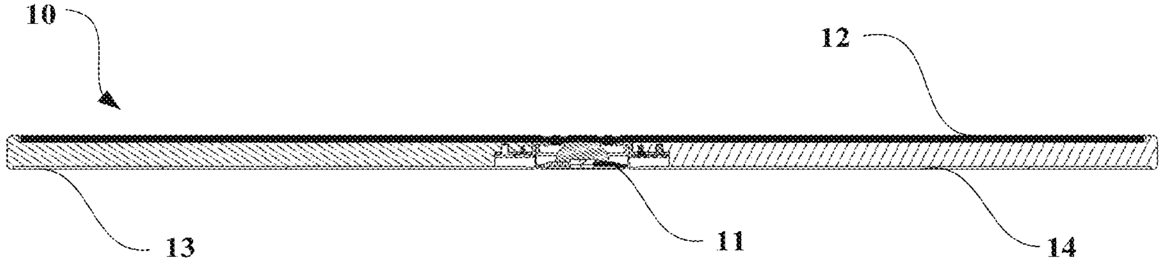
FIG. 2 is a sectional view of the electronic device in FIG. 1 in an A-A direction.
Figure 3:
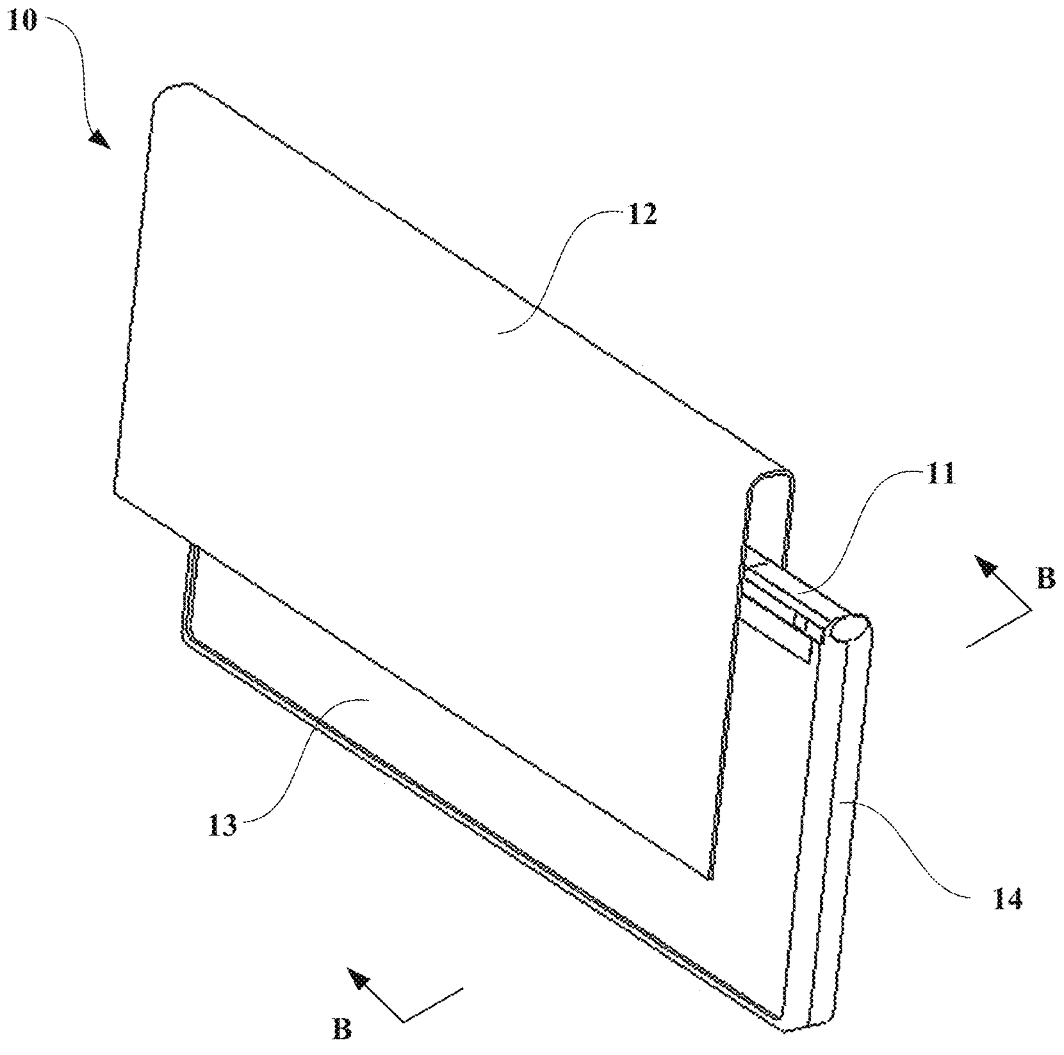
FIG. 3 is a three-dimensional assembly diagram of the electronic device in FIG. 1 in a folded state.
Figure 4:
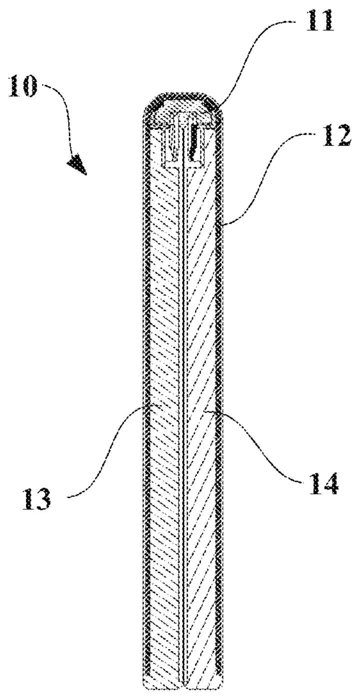
FIG. 4 is a sectional view of the electronic device in FIG. 3 in a B-B direction.

For ease of understanding a hinge mechanism provided in embodiments of this application, the following describes an application scenario of the hinge mechanism. The hinge mechanism may be used in, but is not limited to, a foldable electronic device such as a mobile phone, an intelligent wearable device, a tablet computer, or a notebook computer. When a hinge mechanism provided in embodiments of this application is used in an electronic device, refer to FIG. 1 to FIG. 4. FIG. 1 is a three-dimensional assembly diagram of an electronic device in an unfolded state according to an embodiment of this application. FIG. 2 is a sectional view of the electronic device in FIG. 1 in an A-A direction. FIG. 3 is a three-dimensional assembly diagram of the electronic device in FIG. 1 in a folded state. FIG. 4 is a sectional view of the electronic device in FIG. 3 in a B-B direction. An electronic device 10 provided in this application may be an outward-folding electronic device. The electronic device 10 may include a flexible display 12, a first housing 13, and a second housing 14 in addition to a hinge mechanism 11. The first housing 13 and the second housing 14 are disposed on two sides of the hinge mechanism 11, and may rotate around the hinge mechanism 11. When being used, the electronic device 10 may be folded and unfolded according to different usage scenarios. As shown in FIG. 1 and FIG. 2, the electronic device 10 is in the unfolded state. The flexible display 12 is disposed on one side of the hinge mechanism 11, the first housing 13, and the second housing 14, and is connected to the hinge mechanism 11, the first housing 13, and the second housing 14 separately. In this case, an outer surface that is of the first housing 13 and that is away from the flexible display 12 and an outer surface that is of the second housing 14 and that is away from the flexible display 12 may be jointly used as an appearance surface of the electronic device 10. As shown in FIG. 3 and FIG. 4, the electronic device 10 is in a folded state. The first housing 13 and the second housing 14 are disposed opposite to each other, and the flexible display 12 may be used as both a display surface of the electronic device 10 and an appearance surface of the electronic device 10. It may be understood that a process in which the electronic device 10 changes from the unfolded state shown in FIG. 1 to the folded state shown in FIG. 3, or from the folded state shown in FIG. 3 to the unfolded state shown in FIG. 1 is a process in which the first housing 13 and the second housing 14 rotate around the hinge mechanism 11. In this process, the flexible display 12 is bent or flattened with the first housing 13 and the second housing 14.

In some current foldable electronic devices, when the first housing 13 and the second housing 14 rotate around a hinge mechanism, the hinge mechanism cannot meet a bending support requirement of a flexible display, which may cause the flexible display to be compressed or pulled. In this case, after a plurality of folding operations are performed on the electronic device, the flexible display is prone to damage, which mostly occurs in a foldable part of the flexible display.

Therefore, a rotation structure of a hinge mechanism, as a key functional component in a foldable electronic device, may be designed, so that the hinge mechanism supports a foldable part of a flexible display. The hinge mechanism 11 provided in this application is intended to resolve the foregoing problem, so that the hinge mechanism 11 in an unfolded state can stably support the flexible display 12, and the hinge mechanism 11 in a closed state can form a support structure that can meet a bending requirement of the flexible display 12, to avoid pulling or arching of the flexible display 12, and therefore improve structural reliability of the electronic device 10.

It should be noted that the terms used in the following embodiments are only for a purpose of describing embodiments, but are not intended to limit this application. The terms "one", "a", "the", "the foregoing", and "this" of singular forms used in this specification and the appended claims of this application are also intended to include expressions such as "one or more", unless otherwise specified in the context clearly.

Reference to "an embodiment", "some embodiments", or the like described in this specification indicates that one or more embodiments of this application include a specific feature, structure, or characteristic described with reference to embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise further emphasized in another manner. The terms "include", "have", and their variants all mean "include but are not limited to", unless otherwise further emphasized in another manner.

Figure 5:
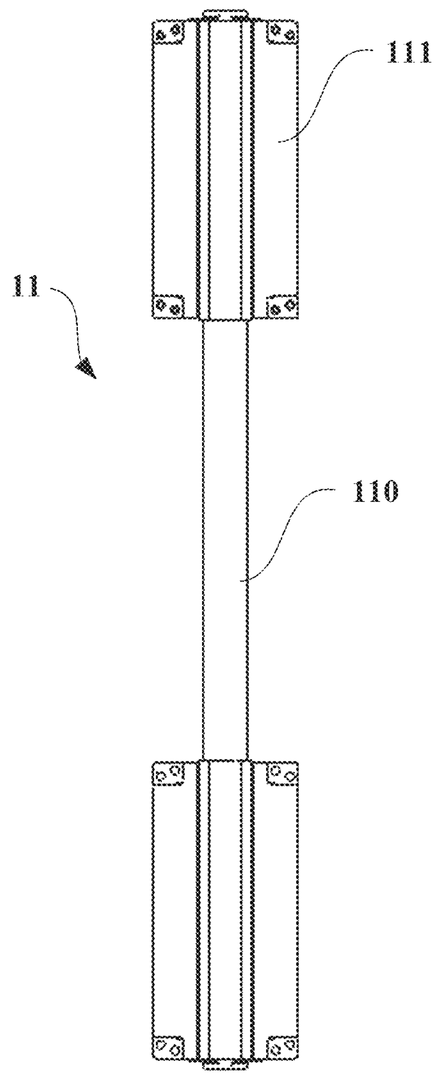
FIG. 5 is a diagram of a structure of a hinge mechanism according to an embodiment of this application.

FIG. 5 is a diagram of a structure of a hinge mechanism according to an embodiment of this application. As shown in FIG. 5, the hinge mechanism 11 may further include a base 110 and at least one hinge assembly 111. In this application, a specific quantity of hinge assemblies 111 is not limited, for example, may be 1, 2, 3, 5, or the like. As shown in FIG. 5, in an optional embodiment, the hinge mechanism 11 may include two hinge assemblies 111. The two hinge assemblies 111 are respectively disposed at two ends of the base 110 to form an I-shaped structure, which is conducive to simplifying a structure of the hinge mechanism 11 and can provide stable rotation.

Figure 6:
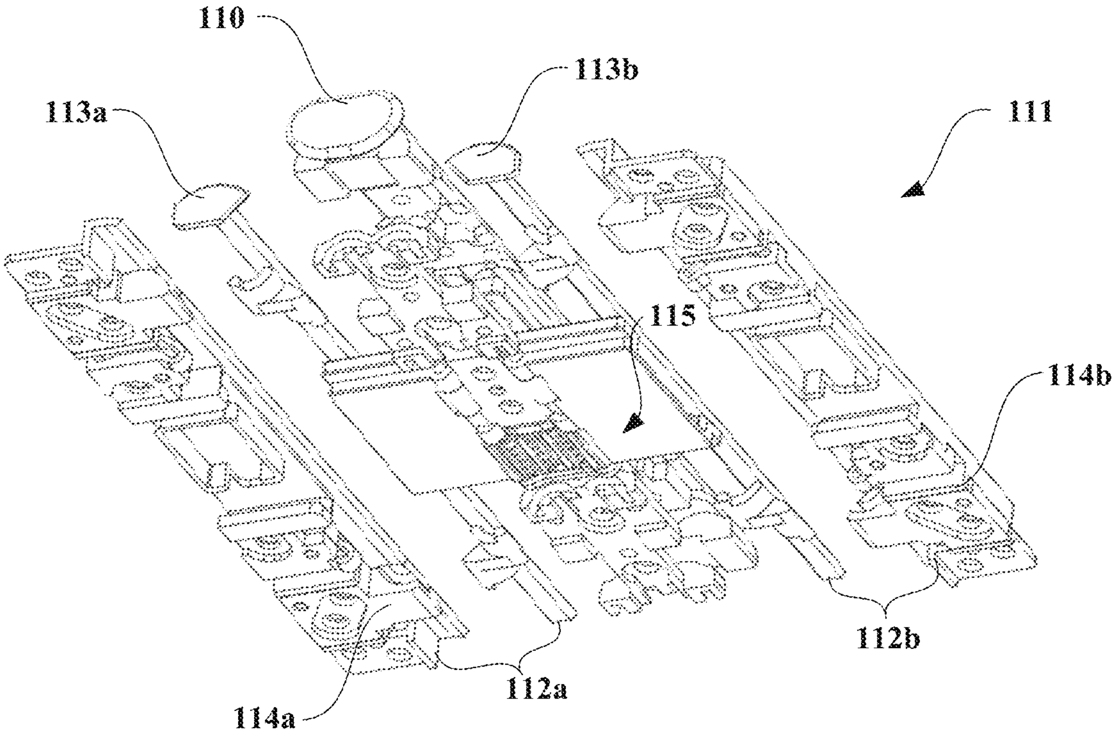
FIG. 6 is a diagram of a structure of a hinge assembly according to an embodiment of this application.
Figure 7:
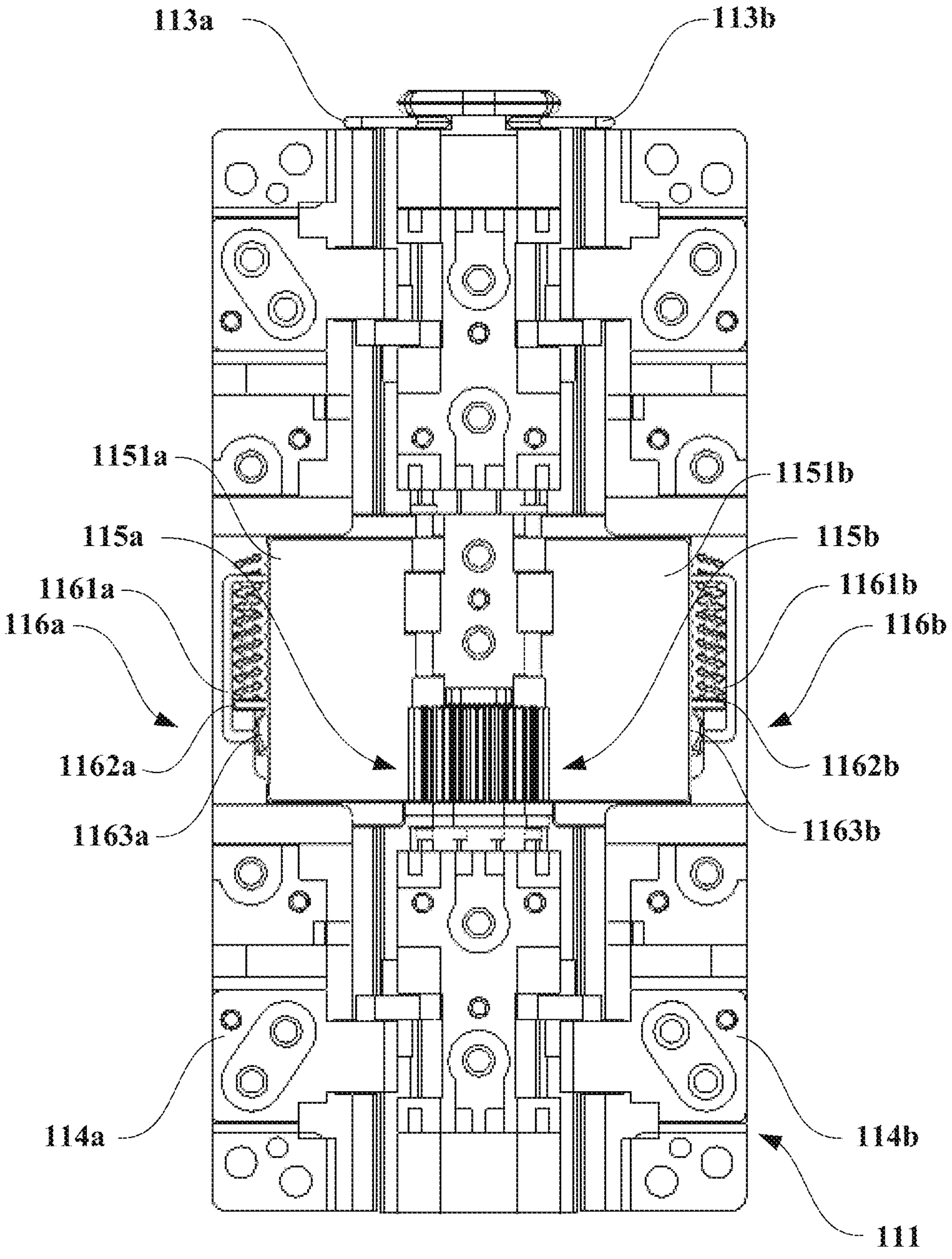
FIG. 7 is a side view of the hinge assembly in FIG. 6.
Figure 8:
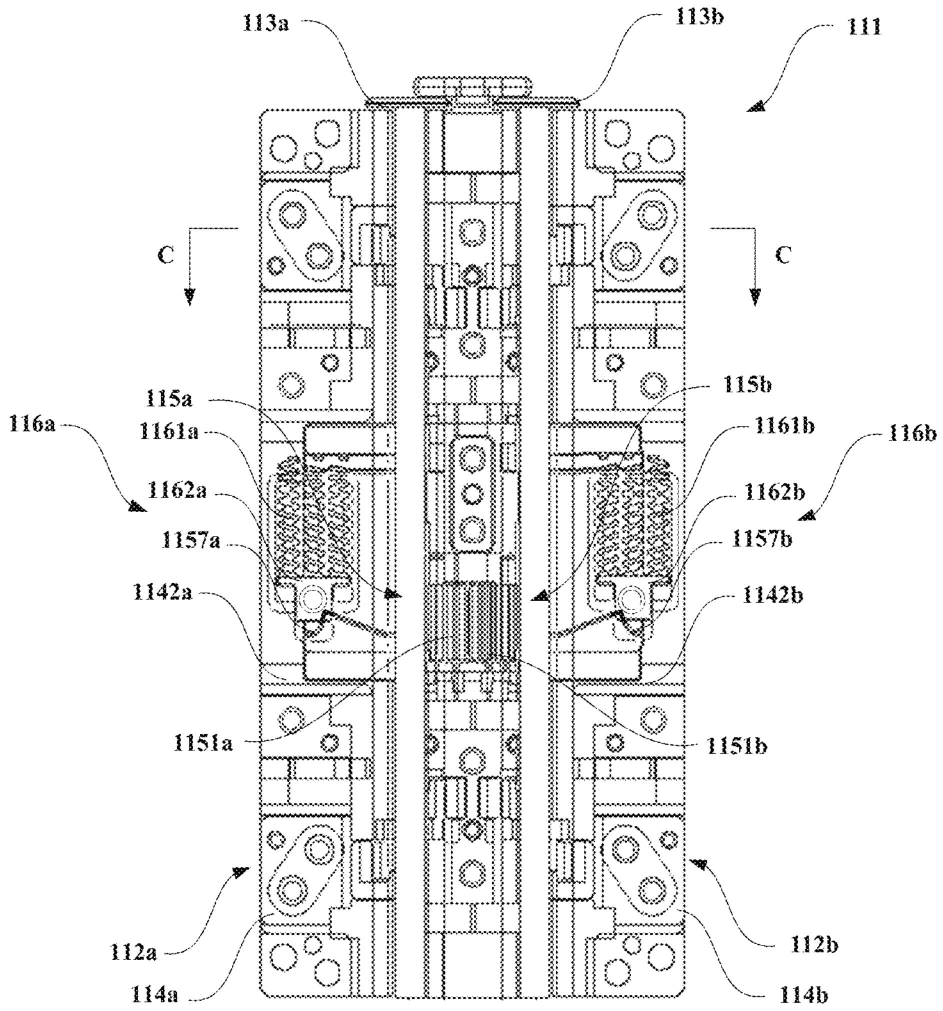
FIG. 8 is another side view of the hinge assembly in FIG. 6.
Figure 9:
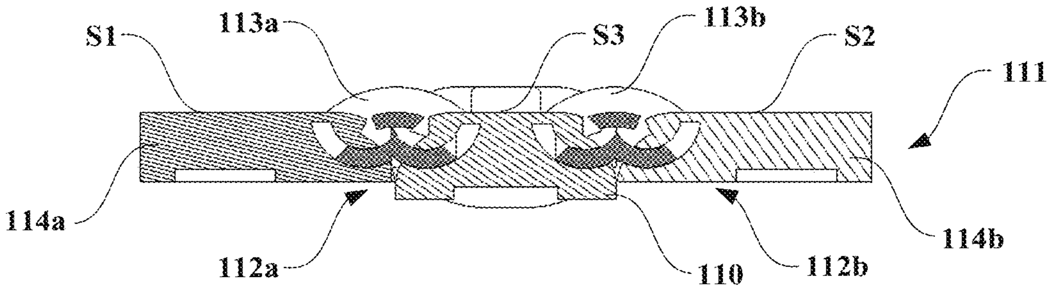
FIG. 9 is a sectional view of a hinge mechanism in FIG. 8 in a C-C direction.

FIG. 6 is a diagram of a structure of a hinge assembly according to an embodiment of this application. FIG. 7 is a side view of the hinge assembly in FIG. 6. As shown in FIG. 6 and FIG. 7, the hinge assembly 111 may include a first rotating assembly **112*a* and a second rotating assembly 112*b*, and the first rotating assembly 112*a* and the second rotating assembly 112*b* are oppositely disposed on two sides of the base 110. FIG. 8 is another side view of the hinge assembly in FIG. 6. FIG. 9 is a sectional view of a hinge mechanism in FIG. 8 in a C-C direction. As shown in FIG. 8 and FIG. 9, the first rotating assembly 112*a* may include a first rotating element 113*a* and a first housing fastening bracket 114*a*. The first rotating element 113*a* may be disposed between the first housing fastening bracket 114*a* and the base 110, and the first rotating element 113*a* is rotatably connected to the base 110 and the first housing fastening bracket 114*a*. A side that is of the first housing fastening bracket 114*a* and that faces the flexible display 12 has a first support surface S1. The second rotating assembly 112*b* may include a second rotating element 113*b* and a second housing fastening bracket 114*b*. The second rotating element 113*b* may be disposed between the second housing fastening bracket 114*b* and the base 110, and the second rotating element 113*b* is rotatably connected to the base 110 and the second housing fastening bracket 114*b***. The flexible display

12 is disposed on one side of the hinge mechanism 11, and the first housing fastening bracket 114*a*, the second housing fastening bracket 114*b*, and the base 110 are separately connected to the flexible display 12. A side that is of the second housing fastening bracket 114*b* and that faces the flexible display 12 has a second support surface S2. A side that is of the base 110 and that faces the flexible display 12 has a third support surface S3. The first support surface S1, the second support surface S2, and the third support surface S3 are separately connected to the flexible display 12. When the hinge mechanism 11 is in a flattened state, the first support surface S1, the second support surface S2, and the third support surface S3 may form a flat support surface for supporting the flexible display 12, to avoid depression of the flexible display 12. When the hinge mechanism 11 is in a folded state, the first support surface S1, the second support surface S2, and the third support surface S3 may form a U-shaped support surface for supporting the flexible display 12, to avoid arching of the flexible display 12. In this way, when the hinge mechanism 11 is folded or unfolded, the hinge mechanism 11 can provide good support for the flexible display 12, thereby improving structural reliability of the electronic device 10.

It should be noted that when the hinge mechanism 11 is in the folded state, the first support surface S1 and the third support surface S3 are disposed opposite to each other, and the U-shaped support surface formed by the first support surface S1, the second support surface S2, and the third support surface S3 may meet a bending requirement of the flexible display 12. In this application, a shape of a support surface formed by the first support surface S1, the second support surface S2, and the third support surface S3 may alternatively be an ellipse or an arc. A specific shape may be designed based on a bending shape of the flexible display 12.

Figure 10:
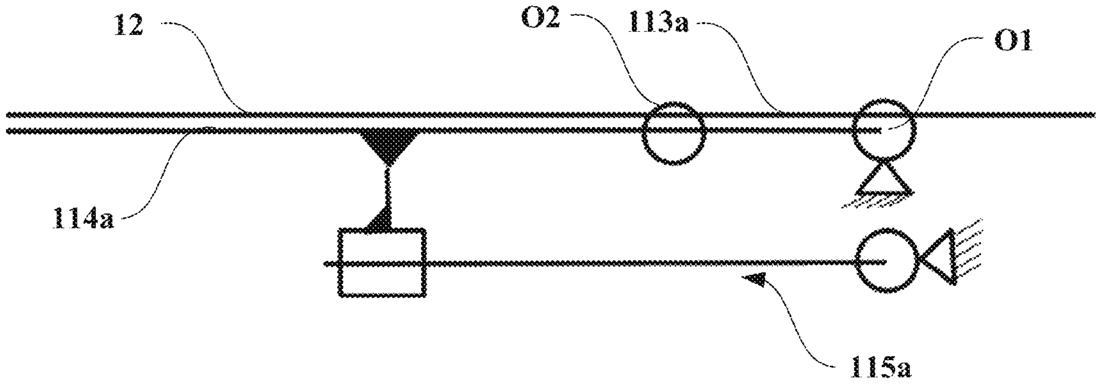
FIG. 10 is a diagram of a motion principle of a hinge assembly in FIG. 9.
Figure 11:
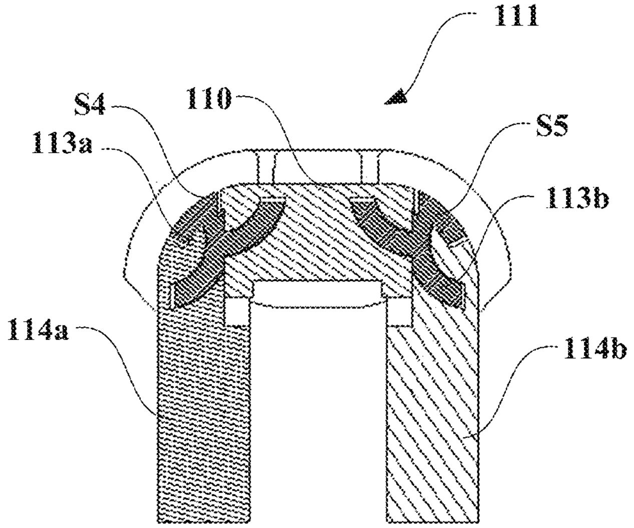
FIG. 11 is a diagram of the hinge mechanism in FIG. 9 in a closed state.
Figure 12:
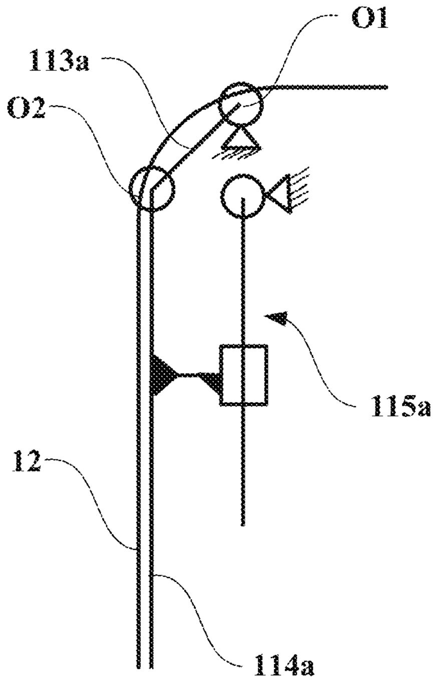
FIG. 12 is a diagram of a motion principle of a hinge assembly in FIG. 11.

FIG. 10 is a diagram of a motion principle of a hinge assembly in FIG. 9. When the hinge mechanism 11 is in the unfolded state, as shown in FIG. 10, the first rotating assembly 112*a* is used as an example. The first rotating element 113*a* and the base 110 have a first rotation center O1, the first rotating element 113*a* and the first housing fastening bracket 114*a* have a second rotation center O2, and the first rotation center O1 and the second rotation center O2 do not overlap. FIG. 11 is a diagram of the hinge mechanism in FIG. 9 in a closed state. FIG. 12 is a diagram of a motion principle of a hinge assembly in FIG. 11. As shown in FIG. 11 and FIG. 12, the hinge mechanism 11 is in the closed state. In this case, compared with the unfolded state, in the closed state, a position of the first rotation center O1 remains unchanged, and a position of the second rotation center O2 is shifted. In a process in which the hinge mechanism 11 changes from the unfolded state shown in FIG. 9 to the folded state shown in FIG. 11, or from the folded state shown in FIG. 11 to the unfolded state shown in FIG. 9, because the first rotation center O1 and the second rotation center O2 do not overlap, an axial phase difference between the first housing fastening bracket 114*a* and the first rotating element 113*a* that are disposed on a same side may be implemented during rotation of the hinge mechanism 11, so that the first housing fastening bracket 114*a* and the first rotating element 113*a* may be telescopically moved relative to the base 110. Similarly, the second rotating element 113*b* and the base 110 have a third rotation center, the second rotating element 113*b* and the second housing fastening bracket 114*b* have a fourth rotation center, and the third rotation center and the fourth rotation center do not overlap. In view of this, an axial phase difference between the second housing fastening bracket 114*b* and the second rotating element 113*b* that are disposed on a same side is implemented during rotation of the hinge mechanism 11, so that the second housing fastening bracket 114*b* and the second rotating element 113*b* may be telescopically moved relative to the base 110. Therefore, in a process in which the hinge mechanism 11 is folded or unfolded, a length of a constant-length layer of the flexible display 12 can be fitted, to avoid pulling or compression of the flexible display 12. In this way, the hinge mechanism 11 in the unfolded state can smoothly support the flexible display 12 of the electronic device 10, and the hinge mechanism 11 in the closed state can form the support structure that meets the bending requirement of the flexible display 12. In addition, when the hinge mechanism 11 is folded or unfolded, the hinge mechanism 11 supports a foldable part of the flexible display 12 in the unfolded state shown in FIG. 9 and the folded state shown in FIG. 11, to avoid pulling or arching of the flexible display 12, and therefore improve structural reliability of the electronic device 10.

In this application, a manner in which the first rotating element 113*a* is rotatably connected to the base 110, the first rotating element 113*a* is rotatably connected to the first housing fastening bracket 114*a*, the second rotating element 113*b* is rotatably connected to the base 110, and the second rotating element 113*b* is rotatably connected to the second housing fastening bracket 114*b* is not limited. In this application, because the first rotating assembly 112*a* and the second rotating assembly 112*b* are symmetrically disposed relative to the base 110, the following uses the first rotating assembly 112*a* as an example to describe structures of the first rotating assembly 112*a* and the second rotating assembly 112*b*.

Figure 13:
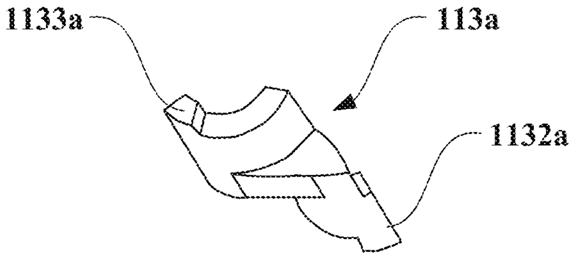
FIG. 13 is a diagram of a structure of a first rotating element according to an embodiment of this application.
Figure 14:
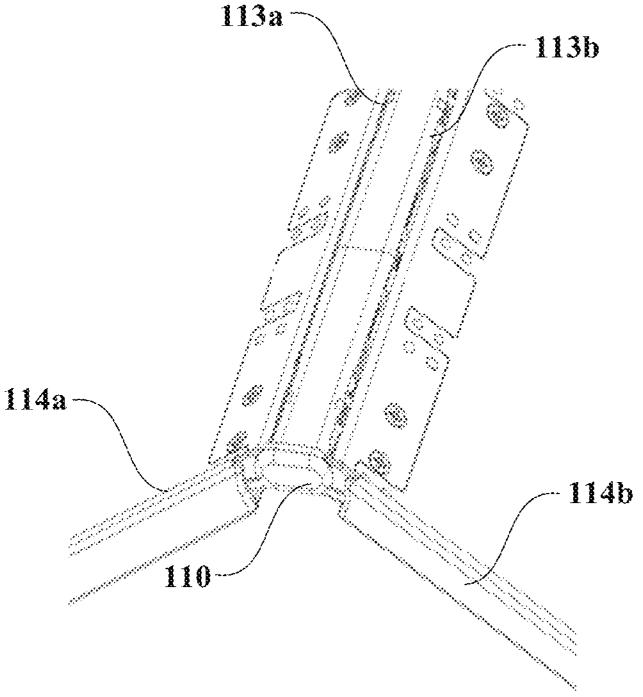
FIG. 14 is a diagram of another structure of a hinge assembly according to an embodiment of this application.

FIG. 13 is a diagram of a structure of a first rotating element according to an embodiment of this application. FIG. 14 is a diagram of another structure of a hinge assembly according to an embodiment of this application. As shown in FIG. 13 and FIG. 14, the first rotating element 113*a* may include a first arc-shaped rotating block 1132*a* and a second arc-shaped rotating block 1133*a* that are fastened to each other. Both a concave surface of the first arc-shaped rotating block 1132*a* and a concave surface of the second arc-shaped rotating block 1133*a* may be provided toward one side of the flexible display 12. The first arc-shaped rotating block 1132*a* is disposed close to the base 110, and the second arc-shaped rotating block 1133*a* is disposed close to the first housing fastening bracket 114*a*. A first arc-shaped guiding groove 1101*a* is provided on a side that is of the base 110 and that faces the first rotating element 113*a*. The first arc-shaped rotating block 1132*a* may be accommodated in the first arc-shaped guiding groove 1101*a*, and slide in the first arc-shaped guiding groove 1101*a* to implement a rotatable connection between the first rotating element 113*a* and the base 110. A second arc-shaped guiding groove 1141*a* is provided on a side that is of the first housing fastening bracket 114*a* and that faces the first rotating element 113*a*. The second arc-shaped rotating block 1133*a* may be accommodated in the second arc-shaped guiding groove 1141*a*, and slide in the second arc-shaped guiding groove 1141*a* to implement a rotatable connection between the first rotating element 113*a* and the first housing fastening bracket 114*a*. In this way, the first arc-shaped rotating block 1132*a* is accommodated in the first arc-shaped guiding groove 1101*a*, the second arc-shaped rotating block 1133*a* is accommodated in the second arc-shaped guiding groove 1141*a*, the first arc-shaped rotating block 1132*a* rotates along the first arc-shaped guiding groove 1101*a*, and the second arc-shaped rotating block 1133*a* rotates along the second arc-shaped guiding groove 1141*a*, to implement a rotatable connection among the base 110, the first rotating element 113*a*, and the first housing fastening bracket 114*a*, so that the base 110 and the first housing fastening bracket 114*a* is rotatably connected to the first rotating element 113*a* through a virtual axis. This effectively reduces space occupied by the first rotating assembly 112*a* when the hinge mechanism 11 is folded or unfolded, and facilitates a miniaturization design of the hinge mechanism 11. Further, when the hinge mechanism 11 is folded, the first arc-shaped rotating block 1132*a* slides into the first arc-shaped guiding groove 1101*a*, and the second arc-shaped rotating block 1133*a* slides into the second arc-shaped guiding groove 1141*a*, and when the hinge mechanism 11 is unfolded, the first arc-shaped rotating block 1132*a* slides out of the first arc-shaped guiding groove 1101*a* in a first direction, and the second arc-shaped rotating block 1133*a* slides out of the second arc-shaped guiding groove 1141*a* in a second direction, so that the first rotation center O1 and the second rotation center O2 do not overlap. Correspondingly, the second rotating element 113*b* may further include a third arc-shaped rotating block and a fourth arc-shaped rotating block that are fastened to each other. Both a concave surface of the third arc-shaped rotating block and a concave surface of the fourth arc-shaped rotating block are provided toward the side of the flexible display 12. A third arc-shaped guiding groove is provided on a side that is of the base 110 and that faces the second rotating element 113*b*. A fourth arc-shaped guiding groove is provided on a side that is of the second housing fastening bracket 114*b* and that faces the second rotating element 113*b*. Further, the third arc-shaped rotating block is accommodated in the third arc-shaped guiding groove, and slides in the third arc-shaped guiding groove to implement a rotatable connection between the second rotating element 113*b* and the base 110. The fourth arc-shaped rotating block is accommodated in the fourth arc-shaped guiding groove, and slides in the fourth arc-shaped guiding groove to implement a rotatable connection between the second rotating element 113*b* and the second housing fastening bracket 114*b*. Further, when the hinge mechanism 11 is folded, the third arc-shaped rotating block slides into the third arc-shaped guiding groove, and the fourth arc-shaped rotating block slides into the fourth arc-shaped guiding groove, and when the hinge mechanism 11 is unfolded, the third arc-shaped rotating block slides out of the third arc-shaped guiding groove, and the fourth arc-shaped rotating block slides out of the fourth arc-shaped guiding groove, so that the third rotation center and the fourth rotation center do not overlap.

Figure 15:
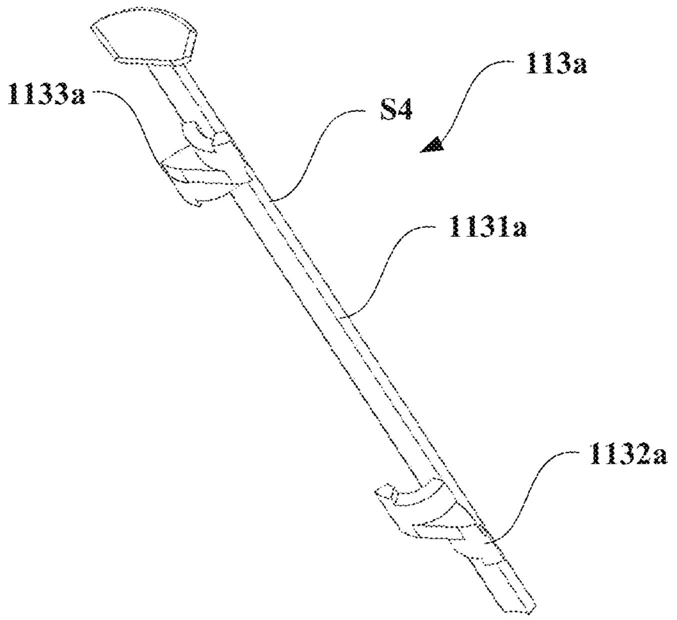
FIG. 15 is a diagram of another structure of a first rotating element according to an embodiment of this application.
Figure 16:
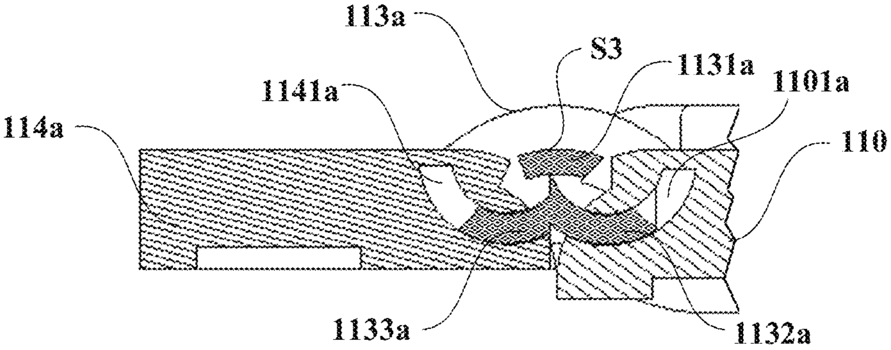
FIG. 16 is a diagram of a part of the hinge mechanism in FIG. 9.

In some other embodiments, when the hinge mechanism is disposed, the first housing fastening bracket 114*a*, the second housing fastening bracket 114*b*, and the base 110 may provide support for the flexible display 12, and the first rotating element 113*a* and the second rotating element 113*b* may also provide support for the flexible display 12. FIG. 15 is a diagram of another structure of a first rotating element according to an embodiment of this application. FIG. 16 is a diagram of a part of the hinge mechanism in FIG. 9. As shown in FIG. 15 and FIG. 16, further, the first rotating element 113*a* may further include a first body 1131*a*, and the first arc-shaped rotating block 1132*a* and the second arc-shaped rotating block 1133*a* are disposed on a side that is of the first body 1131*a* and that is away from the flexible display 12. A side that is of the first body 1131*a* and that faces the flexible display 12 has a first arc-shaped support surface S4, and the first arc-shaped support surface S4 protrudes toward the flexible display 12. Correspondingly, the second rotating element 113*b* may further include a second body. The third arc-shaped rotating block and the fourth arc-shaped rotating block are disposed on a side that is of the second body and that is away from the flexible display 12. A side that is of the second body and that faces the flexible display 12 has a second arc-shaped support surface S5. As shown in FIG. 11, the second arc-shaped support surface S5 protrudes toward the flexible display 12. When the hinge mechanism 11 is in the flattened state, at least a part of the first arc-shaped support surface S4 may be located in the flat support surface and abut against the flexible display 12, and at least a part of the second arc-shaped support surface S5 may be located in the flat support surface and abut against the flexible display 12. When the hinge mechanism 11 is in the folded state, the first support surface S1, the first arc-shaped support surface S4, the third support surface S3, the second arc-shaped support surface S5, and the second support surface S2 form the U-shaped support surface. In this way, when the hinge mechanism 11 is folded or flattened, the first support surface S1, the first arc-shaped support surface S4, the third support surface S3, the second arc-shaped support surface S5, and the second support surface S2 may jointly support the flexible display 12, to further enhance support for the flexible display 12.

The first support surface S1, the second support surface S2, and the third support surface S3 may be planes. Alternatively, in some other embodiments, the first support surface S1, the second support surface S2, and the third support surface S3 may be arc surfaces. For example, in an embodiment, the first support surface S1 may include a first plane and a first arc surface, the first arc surface is provided on a side that is of the first plane and that is close to the first rotating element 113*a*, and the first arc surface may extend in a direction away from the flexible display 12. Similarly, the second support surface S2 may include a second plane and a second arc surface, the second arc surface is provided on a side that is of the second plane and that is close to the second rotating element 113*b*, and the second arc surface may extend in a direction away from the flexible display 12. Correspondingly, the third support surface S3 may include a third plane, a third arc surface, and a fourth arc surface, and the third arc surface and the fourth arc surface are respectively located on two sides of the third plane. The third arc surface is provided close to the first rotating element 113*a*, the fourth arc surface is provided close to the second rotating element 113*b*, and the third arc surface and the fourth arc surface may separately extend in a direction away from the flexible display 12. In this embodiment, in a process in which the first housing fastening bracket 114*a* and the second housing fastening bracket 114*b* are folded or unfolded relative to each other, the first arc surface and the third arc surface may respectively abut against two sides of the first arc-shaped support surface S4, to implement smooth transition of the first support surface S1, the first arc-shaped support surface S4, and the third support surface S3, and the second arc surface and the fourth arc surface respectively abut against two sides of the second arc-shaped support surface S5, to implement smooth transition of the second support surface S2, the second arc-shaped support surface S5, and the third support surface S3. When the hinge mechanism 11 is in the flattened state, the first plane, at least a part of the first arc-shaped support surface S4, the second plane, at least a part of the second arc-shaped support surface S5, and the third plane form the flat support surface, and when the hinge mechanism 11 is in the folded state, the first plane, the first arc surface, the first arc-shaped support surface S4, the third arc surface, the third plane, the fourth arc surface, the second arc-shaped support surface S5, the second arc surface, and the second plane form the U-shaped support surface.

In the foregoing embodiments, the first body 1131*a*, the first arc-shaped rotating block 1132*a*, and the second arc-shaped rotating block 1133*a* may be an integrated structure, to simplify a structure of the first rotating element 113*a* and improve structural strength of the first rotating element 113*a*. Certainly, the first body 1131*a*, the first arc-shaped rotating block 1132*a*, and the second arc-shaped rotating block 1133*a* may alternatively be connected in another connection manner such as welding, bonding, or a threaded connection. This is not limited herein.

Figure 17:
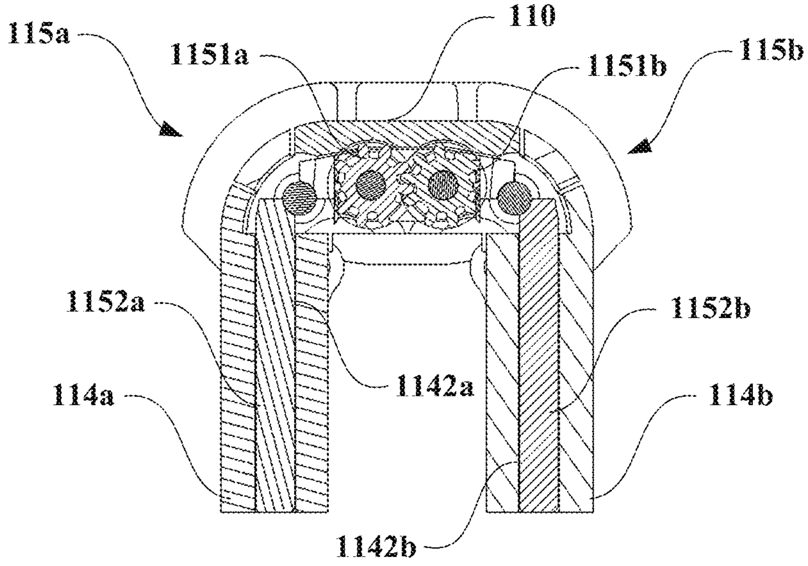
FIG. 17 is a diagram of another structure of a hinge assembly according to an embodiment of this application.
Figure 18:
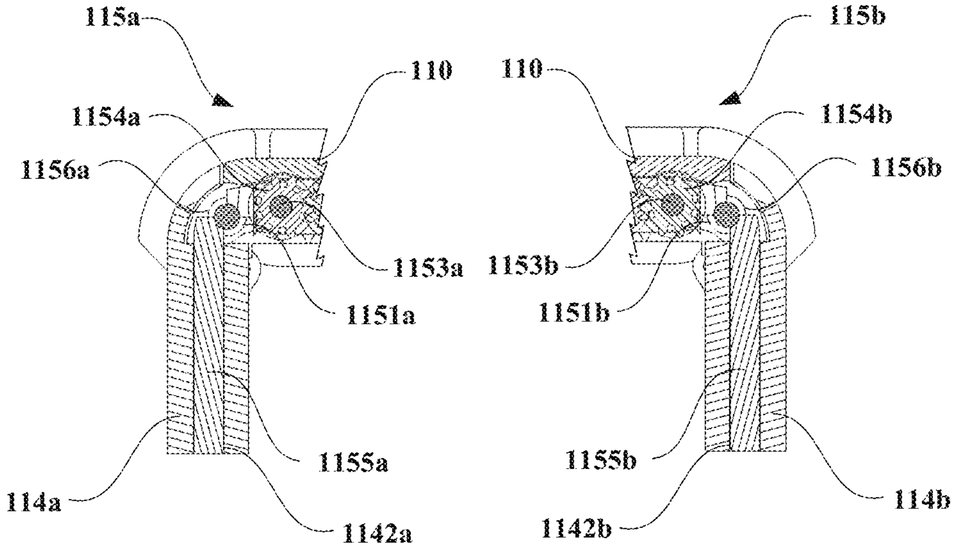
FIG. 18 is a diagram of a part of a hinge mechanism in FIG. 17.

FIG. 17 is a diagram of another structure of a hinge mechanism according to an embodiment of this application. FIG. 18 is a diagram of a part of a hinge mechanism in FIG. 17. As shown in FIG. 17 and FIG. 18, in this application, the hinge assembly 111 may further include a first sliding limiting assembly 115*a* and a second sliding limiting assembly 115*b*, to restrict rotation directions and rotation angles of the first housing fastening bracket 114*a* and the second housing fastening bracket 114*b* relative to the base 110. The first sliding limiting assembly 115*a* is connected between the first housing fastening bracket 114*a* of the first rotating assembly 112*a* and the base 110, and the second sliding limiting assembly 115*b* is connected between the second housing fastening bracket 114*b* of the second rotating assembly 112*b* and the base 110. The first sliding limiting assembly 115*a* may include a first limiting gear 1151*a* and a first limiting gear swing rod 1152*a*. The first limiting gear 1151*a* includes a first limiting gear shaft 1153*a* disposed on the base 110 and a first limiting gear body 1154*a* sleeved on the first limiting gear shaft 1153*a*. The first limiting gear swing rod 1152*a* includes a first limiting sliding block 1155*a* and a first limiting gear part 1156*a*, and the first housing fastening bracket 114*a* is provided with a first limiting chute 1142*a* extending in a direction away from the base 110. The first limiting sliding block 1155*a* may be accommodated in the first limiting chute 1142*a*, and slide in the first limiting chute 1142*a* to restrict a rotation direction of the first rotating assembly 112*a* relative to the base 110. The first limiting gear part 1156*a* is disposed at an end that is of the first limiting sliding block 1155*a* and that faces the base 110, and meshes with the first limiting gear body 1154*a*. The second sliding limiting assembly 115*b* may include a second limiting gear 1151*b* and a second limiting gear swing rod 1152*b*. The second limiting gear 1151*b* includes a second limiting gear shaft 1153*b* disposed on the base 110 and a second limiting gear body 1154*b* sleeved on the second limiting gear shaft 1153*b*. The second limiting gear swing rod 1152*b* includes a second limiting sliding block 1155*b* and a second limiting gear part 1156*b*, and the second housing fastening bracket 114*b* is provided with a second limiting chute 1142*b* extending in a direction away from the base 110. The second limiting sliding block 1155*b* may be accommodated in the second limiting chute 1142*b*, and slide in the second limiting chute 1142*b* to restrict a rotation direction of the second rotating assembly 112*b* relative to the base 110. The second limiting gear part 1156*b* is disposed at an end that is of the second limiting sliding block 1155*b* and that faces the base 110, and meshes with the second limiting gear body 1154*b*. In this embodiment, the first limiting gear body 1154*a* meshes with the second limiting gear body 1154*b*. In a process in which the first housing fastening bracket 114*a* and the second housing fastening bracket 114*b* are folded or unfolded relative to each other, the first limiting gear body 1154*a* and the second limiting gear body 1154*b* may rotate synchronously to drive the first rotating assembly 112*a* and the second rotating assembly 112*b* to open and close synchronously, to implement synchronous motion, so that the flexible display 12 is folded or unfolded synchronously and stably on two sides of the base 110.

Still refer to FIG. 7 and FIG. 8. In some embodiments, the hinge assembly 111 may further include a first damping assembly 116*a* and a second damping assembly 116*b*. The first damping assembly 116*a* may include a first spring 1161*a*, a first moving shaft 1162*a*, and a first roller 1163*a*. One end of the first spring 1161*a* is fastened to the first housing fastening bracket 114*a*, and the other end is connected to the first moving shaft 1162*a*. The first roller 1163*a* is sleeved on the first moving shaft 1162*a* and may rotate around the first moving shaft 1162*a*. A first limiting protrusion 1157*a* is disposed on a side that is of the first limiting sliding block 1155*a* and that faces the housing fastening bracket 114, and the first limiting protrusion 1157*a* abuts against a peripheral side of the first roller 1163*a*. When the first limiting sliding block 1155*a* slides in the first limiting chute 1142*a*, the first limiting protrusion 1157*a* may push the first roller 1163*a* to rotate, and drive the first moving shaft 1162*a* to compress the first spring 1161*a*, to provide a buffer function for sliding of the first limiting sliding block 1155*a*, so that the first limiting sliding block 1155*a* slides more smoothly in the first limiting chute 1142*a*. Similarly, the second damping assembly 116*b* may include a second spring 1161*b*, a second moving shaft 1162*b*, and a second roller 1163*b*. One end of the second spring 1161*b* is fastened to the second housing fastening bracket 114*b*, and the other end is connected to the second moving shaft 1162*b*. The second roller 1163*b* is sleeved on the second moving shaft 1162*b* and may rotate around the second moving shaft 1162*b*. A second limiting protrusion 1157*b* is disposed on a side that is of the second limiting sliding block 1155*b* and that faces the second housing fastening bracket 114*b*, and the second limiting protrusion 1157*b* abuts against a peripheral side of the second roller 1163*b*. When the second limiting sliding block 1155*b* slides in the second limiting chute 1142*b*, the second limiting protrusion 1157*b* may push the second roller 1163*b* to rotate, and drive the second moving shaft 1162*b* to compress the second spring 1161*b*, to provide a buffer function for sliding of the second limiting sliding block 1155*b*, so that the second limiting sliding block 1155*b* slides more smoothly in the second limiting chute 1142*b*.

Figure 19:
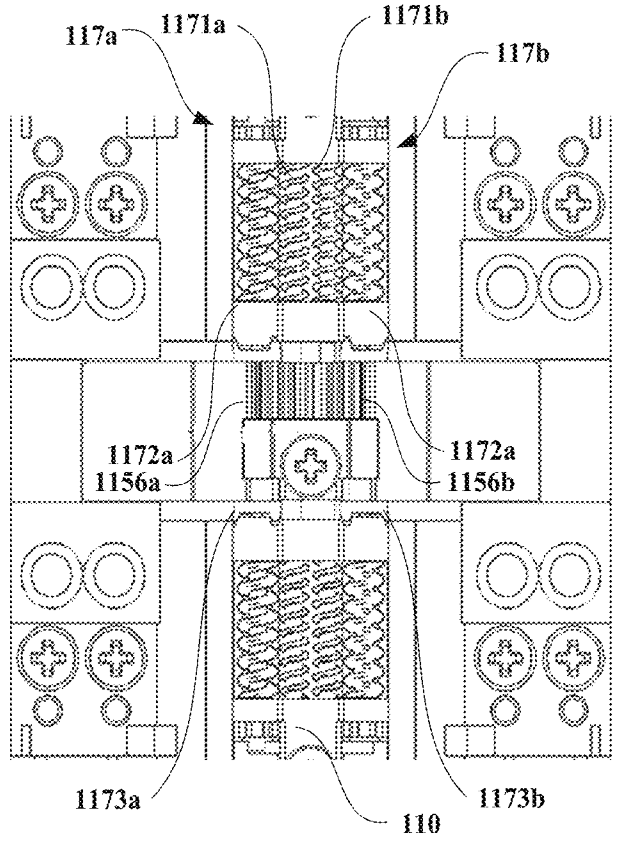
FIG. 19 is a diagram of another structure of a hinge assembly according to an embodiment of this application.

FIG. 19 is a diagram of another structure of a hinge assembly according to an embodiment of this application. As shown in FIG. 19, in some other embodiments, the damping assembly may be alternatively implemented by using another structure. The hinge assembly 111 may further include a third damping assembly 117*a* and a fourth damping assembly 117*b*. The third damping assembly 117*a* includes a third spring 1171*a*, a first damping cam 1172*a*, and a second damping cam 1173*a*. The third spring 1171*a* is disposed on the base 110, and the first damping cam 1172*a* is disposed on one end of the third spring 1171*a*. The second damping cam 1173*a* is fastened to the first limiting gear part 1156*a*, and meshes with the first damping cam 1172*a*. Further, the second damping cam 1173*a* is provided with a protrusion facing the first damping cam 1172*a*, and the first damping cam 1172*a* is provided with a recessed part facing the second damping cam 1173*a*. When the second damping cam 1173*a* meshes with the first damping cam 1172*a*, the protrusion of the second damping cam 1173*a* abuts against the recessed part of the first damping cam 1172*a*. When the first limiting sliding block 1155*a* slides in the first limiting chute 1142*a*, the second damping cam 1173*a* rotates with the first limiting gear part 1156*a*, so that the protrusion rotates in the recessed part. In this way, the first damping cam 1172*a* moves in an axial direction to compress the third spring 1171*a*, so that the third spring 1171*a* generates third elastic force, and sliding of the first limiting sliding block 1155*a* is dampened by using the third elastic force, to provide a buffer function for sliding of the first limiting sliding block 1155*a*. Similarly, the fourth damping assembly 117*b* includes a fourth spring 1171*b*, a third damping cam 1172*b*, and a fourth damping cam 1173*b*. The fourth spring 1171*b* is disposed on the base 110, and the third damping cam 1172*b* is disposed on one end of the fourth spring 1171*b*. The fourth damping cam 1173*b* is fastened to the second limiting gear part 1156*b*, and meshes with the third damping cam 1172*b*. Further, the fourth damping cam 1173*b* is provided with a protrusion facing the third damping cam 1172*b*, and the third damping cam 1172*b* is provided with a recessed part facing the fourth damping cam 1173*b*. When the fourth damping cam 1173*b* meshes with the third damping cam 1172*b*, the protrusion of the fourth damping cam 1173*b* abuts against the recessed part of the third damping cam 1172*b*. When the second limiting sliding block 1155*b* slides in the second limiting chute 1142*b*, the fourth damping cam 1173*b* rotates with the second limiting gear part 1156*b*, so that the protrusion rotates in the recessed part. In this way, the third damping cam 1172*b* moves in an axial direction to compress the fourth spring 1171*b*, so that the fourth spring 1171*b* generates fourth elastic force, and sliding of the second limiting sliding block 1155*b* is dampened by using the fourth elastic force, to provide a buffer function for sliding of the second limiting sliding block 1155*b*.

Figure 20:
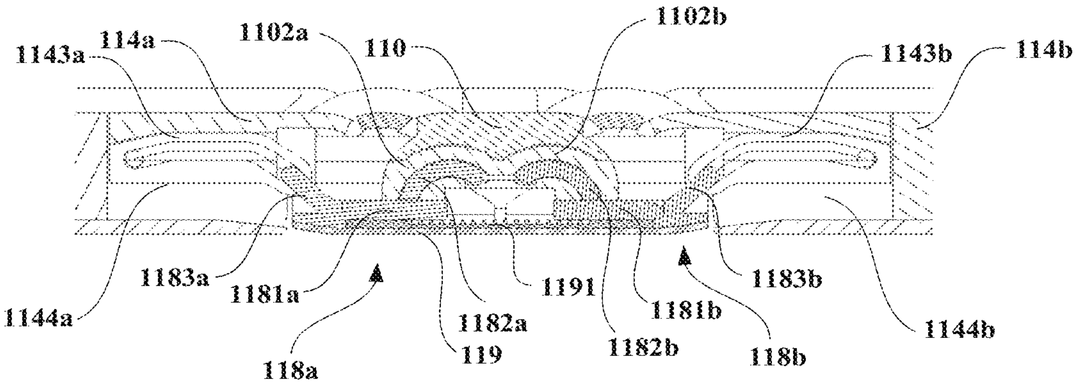
FIG. 20 is a diagram of another structure of a hinge assembly according to an embodiment of this application.
Figure 21:
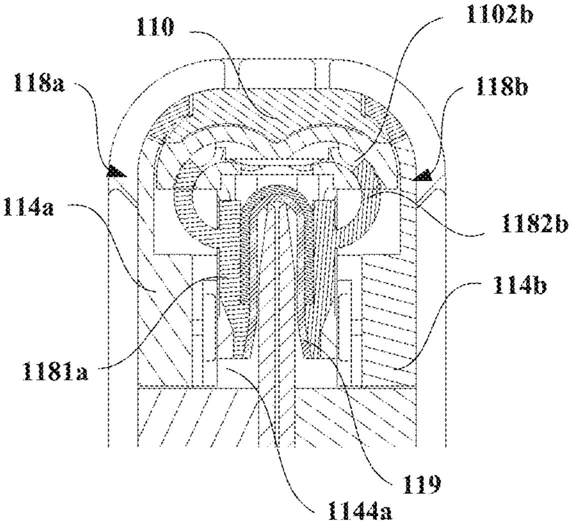
FIG. 21 is a diagram of the hinge assembly in FIG. 20 in a closed state.

FIG. 20 is a diagram of another structure of a hinge assembly according to an embodiment of this application. FIG. 21 is a diagram of the hinge assembly in FIG. 20 in a closed state. As shown in FIG. 20 and FIG. 21, in some optional embodiments, the hinge mechanism 11 may further include a first backplane support assembly 118*a*, a second backplane support assembly 118*b*, and a flexible backplane 119. The flexible backplane 119 shields the base 110 and the hinge assembly 111 by using the first backplane support assembly 118*a* and the second backplane support assembly 118*b*. Further, the first backplane support assembly 118*a* may include a fifth arc-shaped rotating block 1182*a* and a first sliding block 1183*a* that are fastened to each other. The first sliding block 1183*a* is disposed close to the first housing fastening bracket 114*a*, the fifth arc-shaped rotating block 1182*a* is disposed close to the base 110, and a concave surface of the fifth arc-shaped rotating block 1182*a* is disposed away from the flexible display 12. The second backplane support assembly 118*b* includes a sixth arc-shaped rotating block 1182*b* and a second sliding block 1183*b* that are fastened to each other. The second sliding block 1183*b* is disposed close to the second housing fastening bracket 114*b*, the sixth arc-shaped rotating block 1182*b* is disposed close to the base 110, and a concave surface of the sixth arc-shaped rotating block 1182*b* is disposed away from the flexible display 12. In addition, a first guiding groove 1143*a* is provided on a side that is of the first housing fastening bracket 114*a* and that is close to the first backplane support assembly 118*a*, and an end that is of the first guiding groove 1143*a* and that is away from the base 110 extends along the flexible display 12. A second guiding groove 1143*b* is provided on a side that is of the second housing fastening bracket 114*b* and that is close to the second backplane support assembly 118*b*. An end that is of the second guiding groove 1143*b* and that is away from the base 110 extends along the flexible display 12. A fifth arc-shaped guiding groove 1102*a* is provided on a side that is of the base 110 and that is close to the first backplane support assembly 118*a*. A sixth arc-shaped guiding groove 1102*b* is provided on a side that is of the base 110 and that is close to the second backplane support assembly 118*b*. In this embodiment, the first sliding block 1183*a* is accommodated in the first guiding groove 1143*a*, and slides in the first guiding groove 1143*a* to implement a sliding connection between the first backplane support assembly 118*a* and the first housing fastening bracket 114*a*. The fifth arc-shaped rotating block 1182*a* is accommodated in the fifth arc-shaped guiding groove 1102*a*, and slides in the fifth arc-shaped guiding groove 1102*a* to implement a rotatable connection between the first backplane support assembly 118*a* and the base 110. The second sliding block 1183*b* is accommodated in the second guiding groove 1143*b*, and slides in the second guiding groove 1143*b* to implement a sliding connection between the second backplane support assembly 118*b* and the second housing fastening bracket 114*b*. The sixth arc-shaped rotating block 1182*b* is accommodated in the sixth arc-shaped guiding groove 1102*b*, and slides in the sixth arc-shaped guiding groove 1102*b* to implement a rotatable connection between the second backplane support assembly 118*b* and the base 110. The flexible backplane 119 is disposed between the first housing fastening bracket 114*a* and the second housing fastening bracket 114*b*, and covers the base 110, the first rotating assembly 112*a*, the second rotating assembly 112*b*, the first backplane support assembly 118*a*, and the second backplane support assembly 118*b*. The first backplane support assembly 118*a* and the second backplane support assembly 118*b* are separately connected to the flexible backplane 119. When the hinge mechanism 11 is in the flattened state, the flexible backplane 119, a surface of a side that is of the first housing fastening bracket 114*a* and that is away from the flexible display 12, and a surface of a side that is of the second housing fastening bracket 114*b* and that is away from the flexible display 12 may jointly form the appearance surface, to implement appearance integrity and integrity. A first accommodating cavity 1144*a* is further provided on a side that is of the first housing fastening bracket 114*a* and that is close to the flexible backplane 119, and a second accommodating cavity 1144*b* is provided on a side that is of the second housing fastening bracket 114*b* and that is close to the flexible backplane 119. Therefore, when the first housing fastening bracket 114*a* and the second housing fastening bracket 114*b* are folded relative to each other, the first sliding block 1183*a* slides in the first guiding groove 1143*a* in a direction away from the base 110, the fifth arc-shaped rotating block 1182*a* slides in the fifth arc-shaped guiding groove 1102*a* in a direction away from the base 110, the second sliding block 1183*b* slides in the second guiding groove 1143*b* in a direction away from the base 110, and the sixth arc-shaped rotating block 1182*b* slides in the sixth arc-shaped guiding groove 1102*b* in a direction away from the base 110, so that the flexible backplane 119 is folded and two ends of the flexible backplane 119 may respectively extend into the first accommodating cavity 1144*a* and the second accommodating cavity 1144*b*, to accommodate the flexible backplane 119.

In some embodiments, the first backplane support assembly 118*a* may further include a first support plate 1181*a*. The first sliding block 1183*a* and the fifth arc-shaped rotating block 1182*a* are disposed on a side that is of the first support plate 1181*a* and that faces the flexible display 12. The flexible backplane 119 is connected to a side that is of the first support plate 1181*a* and that is away from the flexible display 12. The second backplane support assembly 118*b* may further include a second support plate 1181*b*. The second sliding block 1183*b* and the sixth arc-shaped rotating block 1182*b* are disposed on a side that is of the second support plate 1181*b* and that faces the flexible display 12. The flexible backplane 119 is connected to a side that is of the second support plate 1181*b* and that is away from the flexible display 12. When the flexible backplane 119 is bent, a surface that is of the flexible backplane 119 and that is away from the base 110 is closer to a curvature center than a surface that is of the flexible backplane 119 and that faces the base 110, so that pulling force exerted on the surface that is of the flexible backplane 119 and that faces the base 110 is greater than pulling force exerted on the surface that is of the flexible backplane 119 and that is away from the base 110. A blind hole structure 1191 is disposed on a surface of a side that is of the flexible backplane 119 and that faces the flexible display 12. The blind hole structure 1191 is located between the first support plate 1181*a* and the second support plate 1181*b*, so that surface stress distribution of the flexible backplane 119 can be improved, and bending resistance of the flexible backplane 119 can be improved. Further, when the hinge mechanism 11 is in the closed state, the first support plate 1181*a*, the second support plate 1181*b*, the first housing fastening bracket 114*a*, the second housing fastening bracket 114*b*, and the base 110 can form water drop-like accommodating space that meets a bending requirement of the flexible backplane 119, to avoid pulling or compression the flexible backplane 119, so as to reduce a risk of damage to the flexible backplane 119.

In the foregoing embodiments, the first support plate 1181*a*, the fifth arc-shaped rotating block 1182*a*, and the first sliding block 1183*a* may be an integrated structure, to simplify a structure of the first backplane support assembly 118*a* and improve structural strength of the first backplane support assembly 118*a*. Certainly, the first support plate 1181*a*, the fifth arc-shaped rotating block 1182*a*, and the first sliding block 1183*a* may alternatively be connected in another connection manner such as welding, bonding, or a threaded connection. This is not limited herein. The second support plate 1181*b*, the sixth arc-shaped rotating block 1182*b*, and the second sliding block 1183*b* may also be disposed in a similar manner. Details are not described herein again.

Figure 22:
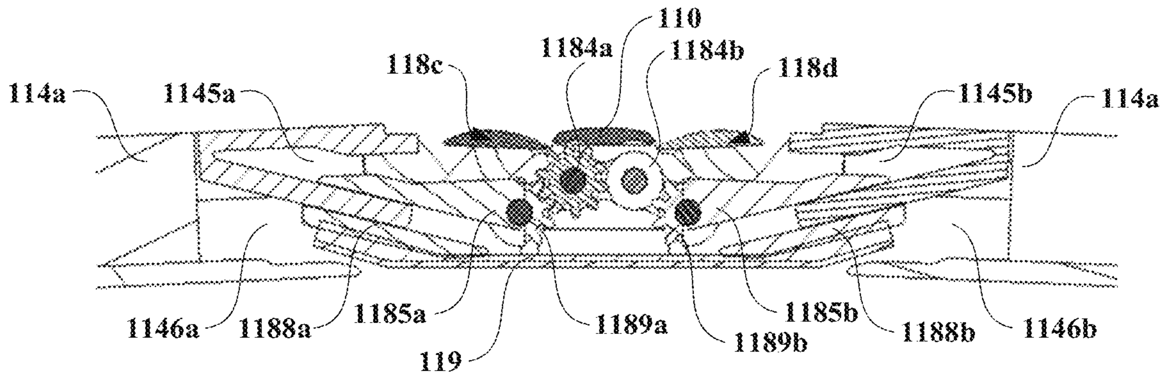
FIG. 22 is a diagram of another structure of a hinge assembly according to an embodiment of this application.
Figure 23:
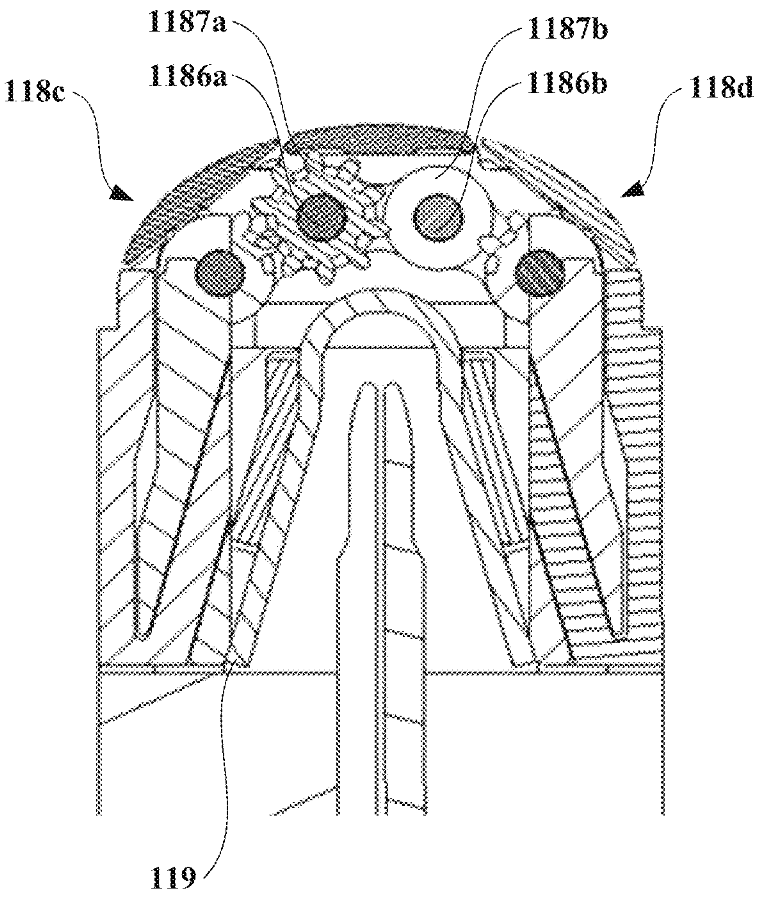
FIG. 23 is a diagram of the hinge assembly in FIG. 22 in a closed state.

In some other optional embodiments, the backplane support assembly may alternatively be implemented in another manner. FIG. 22 is a diagram of another structure of a hinge assembly according to an embodiment of this application. FIG. 23 is a diagram of the hinge assembly in FIG. 22 in a closed state. As shown in FIG. 22 and FIG. 23, the hinge mechanism 11 may further include the flexible backplane 119, a third backplane support assembly 118*c*, and a fourth backplane support assembly 118*d*. The third backplane support assembly 118*c* includes a third rotating gear 1184*a* and a third rotating gear swing rod 1185*a*. The third rotating gear 1184*a* includes a third rotating gear shaft 1186*a* disposed on the base 110 and a third rotating gear body 1187*a* sleeved on the third rotating gear shaft 1186*a*. The third rotating gear swing rod 1185*a* includes a third swing rod sliding block 1188*a* and a third swing rod gear part 1189*a*. A third guiding groove 1145*a* is provided on a side that is of the first housing fastening bracket 114*a* and that faces the third backplane support assembly 118*c*, and an end that is of the third guiding groove 1145*a* and that is away from the base 110 extends along the flexible display 12. The third swing rod sliding block 1188*a* is accommodated in the third guiding groove 1145*a*. The third swing rod gear part 1189*a* is disposed at an end that is of the third swing rod sliding block 1188*a* and that faces the base 110, and meshes with the third rotating gear body 1187*a*. The fourth backplane support assembly 118*d* includes a fourth rotating gear 1184*b* and a fourth rotating gear swing rod 1185*b*. The fourth rotating gear 1184*b* includes a fourth rotating gear shaft 1186*b* disposed on the base 110 and a fourth rotating gear body 1187*b* sleeved on the fourth rotating gear shaft 1186*b*. The fourth rotating gear swing rod 1185*b* includes a fourth swing rod sliding block 1188*b* and a fourth swing rod gear part 1189*b*. A fourth guiding groove 1145*b* is provided on a side that is of the second housing fastening bracket 114*b* and that faces the fourth backplane support assembly 118*d*, and an end that is of the fourth guiding groove 1145*b* and that is away from the base 110 extends along the flexible display 12. The fourth swing rod sliding block 1188*b* is accommodated in the fourth guiding groove 1145*b*. The fourth swing rod gear part 1189*b* is disposed at an end that is of the fourth swing rod sliding block 1188*b* and that faces the base 110, and meshes with the fourth rotating gear body 1187*b*. The flexible backplane 119 is disposed between the first housing fastening bracket 114*a* and the second housing fastening bracket 114*b*, and covers the base 110, the first rotating assembly 112*a*, the second rotating assembly 112*b*, the third backplane support assembly 118*c*, and the fourth backplane support assembly 118*d*. The third backplane support assembly 118*c* and the fourth backplane support assembly 118*d* are separately connected to the flexible backplane 119. A third accommodating cavity 1146*a* is further provided on a side that is of the first housing fastening bracket 114*a* and that is close to the flexible backplane 119, and a fourth accommodating cavity 1146*b* is provided on a side that is of the second housing fastening bracket 114*b* and that is close to the flexible backplane 119. When the first housing fastening bracket 114*a* and the second housing fastening bracket 114*b* are folded relative to each other, the third swing rod sliding block 1188*a* slides in the third guiding groove 1145*a* in a direction away from the base 110, and the fourth swing rod sliding block 1188*b* slides in the fourth guiding groove 1145*b* in a direction away from the base 110, so that the flexible backplane 119 is folded and two ends of the flexible backplane 119 respectively extend into the third accommodating cavity 1146*a* and the fourth accommodating cavity 1146*b*.

The foregoing descriptions are example implementations of this application, and are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A hinge mechanism comprising:

a first hinge side configured to dispose a flexible display of a foldable electronic device;

a base comprising a first base side that is configured to face the flexible display and that has a base support surface; and at least one hinge assembly comprising:

a first rotating assembly comprising:

a first housing fastening bracket comprising a first housing fastening bracket first side that is configured to face the flexible display and that has a first housing fastening bracket support surface; and a first rotating element rotatably couple to the base and the first housing fastening bracket; and a second rotating assembly comprising:
a second housing fastening bracket comprising a second housing fastening bracket first side that is configured to face the flexible display and that has a second housing fastening bracket support surface; and
a second rotating element that is rotatably coupled to the base and the second housing fastening bracket,
wherein the first rotating assembly and the second rotating assembly are disposed opposite to each other on two sides of the base,
wherein the first housing fastening bracket support surface, the second housing fastening bracket support surface, and the base support surface are configured to separately couple to the flexible display and form:
a flat support surface configured to support the flexible display when the hinge mechanism is in a flattened state; and
a U-shaped support surface configured to support the flexible display when the hinge mechanism is in a folded state;
a first sliding limiting assembly coupled between the first housing fastening bracket and the base and comprising:
a first limiting gear comprising:
a first limiting gear shaft disposed on the base; and
a first limiting gear body sleeved on the first limiting gear shaft; and
a first limiting gear swing rod comprising:
a first limiting sliding block comprising a first limiting sliding block end that faces the base; and
a first limiting gear part disposed at the first limiting sliding block end and configured to mesh with the first limiting gear body; and
a second sliding limiting assembly coupled between the second housing fastening bracket and the base and comprising:
a second limiting gear comprising:
a second limiting gear shaft disposed on the base; and
a second limiting gear body sleeved on the second limiting gear shaft and configured to mesh with the first limiting gear body; and
a second limiting gear swing rod comprising:
a second limiting sliding block comprising a second limiting sliding block end that faces the base; and
a second limiting gear part disposed at the second limiting sliding block end and configured to mesh with the second limiting gear body.

2. The hinge mechanism of claim 1, wherein the base further comprises:
a second base side that faces the first rotating element; and
a third base side that faces the second rotating element,
wherein the first housing fastening bracket further comprises a first housing fastening bracket second side that faces the first rotating element,
wherein the second housing fastening bracket further comprises a second housing fastening bracket second side that faces the second rotating element,
wherein the first rotating element comprises:
a first arc-shaped guiding groove disposed on the second base side;
a second arc-shaped guiding groove disposed on the first housing fastening bracket second side;
a first arc-shaped rotating block comprising a first arc-shaped rotating block concave surface configured to dispose towards a flexible display side of the flexible display, configured to be accommodated in the first arc-shaped guiding groove, and configured to slide in the first arc-shaped guiding groove to implement a first rotatable connection between the first rotating element and the base, wherein the first arc-shaped rotating block and the first arc-shaped guiding groove have a first rotation center; and
a second arc-shaped rotating block fastened to the first arc-shaped rotating block, comprising a second arc-shaped rotating block concave surface disposed towards the flexible display side, configured to be accommodated in the second arc-shaped guiding groove, and slides configured to slide in the second arc-shaped guiding groove to implement a second rotatable connection between the first rotating element and the first housing fastening bracket, wherein the second arc-shaped rotating block and the second arc-shaped guiding groove have a second rotation center, wherein the first rotation center and the second rotation center do not overlap,
wherein the second rotating element comprises:
a third arc-shaped guiding groove disposed on the third base side;
a fourth arc-shaped guiding groove disposed on the second housing fastening bracket second side;
a third arc-shaped rotating block comprising a third concave surface disposed towards the flexible display side, accommodated in the third arc-shaped guiding groove, and configured to slide in the third arc-shaped guiding groove to implement a third rotatable connection between the second rotating element and the base, wherein the third arc-shaped rotating block and the third arc-shaped guiding groove have a third rotation center; and
a fourth arc-shaped rotating block fastened to the third arc-shaped rotating block, comprising a fourth concave surface disposed towards the flexible display side, accommodated in the fourth arc-shaped guiding groove, and slides configured to slide in the fourth arc-shaped guiding groove to implement a fourth rotatable connection between the second rotating element and the second housing fastening bracket, wherein the fourth arc-shaped rotating block and the fourth arc-shaped guiding groove have a fourth rotation center, and wherein the third rotation center and the fourth rotation center do not overlap.

3. The hinge mechanism of claim 2, wherein the first rotating element further comprises a first body comprising:
a first body first side that is configured to be located away from the flexible display, wherein the first arc-shaped rotating block and the second arc-shaped rotating block are disposed the first body first side; and,
a first body second side that is configured to face the flexible display and that has a first arc-shaped support surface configured to protrude toward the flexible display; display,
wherein the second rotating element further comprises a second body comprising:
a second body first side that is configured to be located away from the flexible display, wherein the third arc-shaped rotating block and the fourth arc-shaped rotating block are disposed on the second body first side; and a second body second side that faces the flexible display and that has a second arc-shaped support surface configured to protrude toward the flexible display, wherein when the hinge mechanism is in the flattened state;

a first part of the first arc-shaped support surface is configured to be located in the flat support surface and abut against the flexible display; and a second part of the second arc-shaped support surface is configured to be located in the flat support surface and abut against the flexible display, and wherein when the hinge mechanism is in the folded state, the first housing fastening bracket support surface, the first arc-shaped support surface, the base support surface, the second arc-shaped support surface, and the second housing fastening bracket support surface are configured to form the U-shaped support surface.

4. The hinge mechanism of claim 3, wherein the first housing fastening bracket support surface comprises:

a first plane comprising a first plane side proximate to the first rotating element; and a first arc surface disposed on the first plane side extended in a first direction away from the flexible display, wherein the second housing fastening bracket support surface comprises:

a second plane comprising a second plane side proximate to the second rotating element; and a second arc surface disposed on the second plane side and extended in a second direction away from the flexible display, wherein the third base support surface comprises:

a third plane comprising:

a third plane first side; and a third plane second side, a third arc surface located on the third plane first side, disposed proximate to the first rotating element, and extended in a third direction away from the flexible display; and a fourth arc surface located on of the third plane second side, provided disposed proximate to the second rotating element, and extended in the third direction, wherein when the first housing fastening bracket and the second housing fastening bracket are folded or unfolded relative to each other:

the first arc surface and the third arc surface respectively abut against two sides of the first arc-shaped support surface; and the second arc surface and the fourth arc surface respectively abut against two sides of the second arc-shaped support surface, wherein when the hinge mechanism is in the flattened state, the first plane, a third part of the first arc-shaped support surface, the second plane, a fourth part of the second arc-shaped support surface, and the third plane are configured to form the flat support surface, and wherein when the hinge mechanism is in the folded state, the first plane, the first arc surface, the first arc-shaped support surface, the third arc surface, the third plane, the fourth arc surface, the second arc-shaped support surface, the second arc surface, and the second plane are configured to form the U-shaped support surface.

5. The hinge mechanism of claim 1, wherein the first housing fastening bracket comprises a first limiting chute extending in a first direction away from the base, wherein the second housing fastening bracket comprises a second limiting chute extending in a second direction away from the base, wherein the first limiting sliding block is accommodated in the first limiting chute and configured to slide in the first limiting chute to restrict a first rotation direction of the first rotating assembly relative to the base, wherein the second limiting sliding block is accommodated in the second limiting chute and configured to slide in the second limiting chute to restrict a second rotation direction of the second rotating assembly relative to the base.

6. The hinge mechanism of claim 5, wherein the at least one hinge assembly further comprises:

a first damping assembly comprising:

a first spring comprising:

a first spring first end fastened to the first housing fastening bracket; and a first spring second end;

a first a first moving shaft coupled to the first spring second end; and a first roller sleeved on the first moving shaft, configured to rotate around the first moving shaft, and comprising a first roller peripheral side; and a second damping assembly comprising:

a second spring comprising:

a second spring first end fastened to the second housing fastening bracket; and a second spring second end;

a second moving shaft coupled to the second spring second end; and a second roller sleeved on the second moving shaft, configured to rotate around the second moving shaft, and comprising a second roller peripheral side, wherein the first limiting sliding block is disposed with a first limiting protrusion, configured to:

abut against the first roller peripheral side; and when the first limiting sliding block slides in the first limiting chute;

push the first roller to rotate; and drive the first moving shaft to compress the first spring to make the first spring generate a first elastic force to dampen sliding of the first limiting sliding block, and wherein the second limiting sliding block comprises a second limiting protrusion and configured to:

abut against the second roller peripheral side; and when the second limiting sliding block slides in the second limiting chute:

push the second roller to rotate; and drive the second moving shaft to compress the second spring to make the second spring generate a second elastic force to dampen sliding of the second limiting sliding block.

7. The hinge mechanism of claim 5, wherein the at least one hinge assembly further comprises;

a first damping assembly comprising:

a first spring disposed on the base and comprising a first spring end;

a first damping cam disposed on the first spring end; and a second damping cam fastened to the first limiting gear part and configured to mesh with the first damping cam; and a second damping assembly comprising:

a second spring disposed on the base and comprising a second spring end;

a third damping cam disposed on the second spring end; and a fourth damping cam fastened to the second limiting gear part and configured to mesh with the third damping cam, wherein when the first limiting sliding block slides in the first limiting chute, the second damping cam is configured to push the first damping cam and compress the first spring to make the first spring generate a first elastic force to dampen sliding of the first limiting sliding block, and wherein when the second limiting sliding block slides in the second limiting chute, the fourth damping cam is configured to push the third damping cam and compress the second spring to make the second spring generate a second elastic force to dampen sliding of the second limiting sliding block.

8. The hinge mechanism of claim 1, further comprising:

a first backplane support assembly comprising:

a first sliding block disposed proximate to the first housing fastening bracket; and a first arc-shaped rotating block fastened to the first sliding block, disposed proximate to the base, and comprising a first arc-shaped rotating block concave surface that is disposed away from the flexible display; and a second backplane support assembly comprising:

a second sliding block disposed proximate to the second housing fastening bracket; and a second arc-shaped rotating block fastened to the second sliding block, disposed proximate to the base, and comprising a second arc-shaped rotating block concave surface that is disposed away from the flexible display, wherein the base further comprises:

a second base side proximate to the first backplane support assembly; and a third base side proximate to the second backplane support assembly;

a first guiding groove provided on the first housing fastening bracket second side and comprising a first guiding groove end that is located away from the base and that is configured to extend along the flexible display;

a second guiding groove provided on the second housing fastening bracket second side and comprising a second guiding groove end that is located away from the base and that is configured to extend along the flexible display;

a first arc-shaped guiding groove provided on the second base side;

second arc-shaped guiding groove disposed on the third base side, wherein the first sliding block is accommodated in the first guiding groove and slide in the first guiding groove to implement a first sliding connection between the first backplane support assembly and the first housing fastening bracket, wherein the first arc-shaped rotating block is accommodated in the first arc-shaped guiding groove and slide in the first arc-shaped guiding groove to implement a first rotatable connection between the first backplane support assembly and the base, wherein the second sliding block is accommodated in the second guiding groove and slide in the second guiding groove to implement a second sliding connection between the second backplane support assembly and the second housing fastening bracket, wherein the second arc-shaped rotating block is accommodated in the second arc-shaped guiding groove and slide in the second arc-shaped guiding groove to implement a second rotatable connection between the second backplane support assembly and the base; and a flexible backplane disposed between the first housing fastening bracket and the second housing fastening bracket, comprising two ends, configured to cover the base, the first rotating assembly, the second rotating assembly, the first backplane support assembly, and the second backplane support assembly, and separately coupled to the first backplane support assembly and the second backplane support assembly, wherein the first housing fastening bracket further comprises a first housing fastening bracket second side proximate to the first backplane support assembly and a first housing fastening bracket third side proximate to the flexible backplane, wherein the second housing fastening bracket further comprises a second housing fastening bracket second side proximate to the second backplane support assembly and a second housing fastening bracket third side proximate to the flexible backplane;

a first accommodating cavity disposed on the first housing fastening bracket third side; and a second accommodating cavity disposed on the second housing fastening bracket third side, and wherein when the first housing fastening bracket and the second housing fastening bracket are folded relative to each other:

the first sliding block is configured to slide in the first guiding groove in a first direction away from the base;

the first arc-shaped rotating block is configured to slide in the first arc-shaped guiding groove in a second direction away from the base;

the second sliding block is configured to slide in the second guiding groove in a third direction away from the base;

the second arc-shaped rotating block is configured to slide in the second arc-shaped guiding groove in a fourth direction away from the base; and the flexible backplane is configured to be folded; and the two ends respectively extend into the first accommodating cavity and the second accommodating cavity.

9. The hinge mechanism of claim 8, wherein the flexible backplane comprises a flexible backplane side that faces the flexible display and that comprises a first surface, and wherein the first backplane support assembly further comprises a first support plate comprising:

a first support plate first side that faces the flexible display, wherein the first sliding block and the first arc-shaped rotating block are disposed on the first support plate side; and a first support plate second side that is located away from the flexible display, wherein the flexible backplane is coupled to the first support plate second side, wherein the second backplane support assembly further comprises a second support plate comprising:

a second support plate first side that faces the flexible display, wherein the second sliding block and the second arc-shaped rotating block are disposed on the second support plate side; and a second support plate second side that is located away from the flexible display, wherein the flexible backplane is coupled to the second support plate second side, and wherein the hinge mechanism further comprises a blind hole structure disposed on the first surface and located between the first support plate and the second support plate.

10. The hinge mechanism of claim 1, further comprising:
a first backplane support assembly comprising:
a first rotating gear comprising:
a first rotating gear shaft disposed on the base; and
a first rotating gear body sleeved on the first rotating gear shaft; and
a first rotating gear swing rod comprising:
a first swing rod sliding block comprising a first swing rod sliding block end that faces the base; and
a first swing rod gear part disposed at the first swing rod sliding block end and configured to mesh with the first rotating gear body,
a first guiding groove disposed on the first housing fastening bracket second side and comprising a first guiding groove end that is located away from the base and that extends along the flexible display, and wherein the first swing rod sliding block is accommodated in the first guiding groove;
a second backplane support assembly comprising:
a second rotating gear comprising:
a second rotating gear shaft disposed on the base; and
a second rotating gear body sleeved on the second rotating gear shaft, the fourth; and
a second rotating gear swing rod comprising:
a second swing rod sliding block comprising a second swing rod sliding block end that faces the base; and
a second swing rod gear part disposed at the second swing rod sliding block end and configured to mesh with the second rotating gear body,
a second guiding groove disposed on the second housing fastening bracket second side and comprising a second guiding groove end that is located away from the base and that extends along the flexible display, and wherein the second swing rod sliding block is accommodated in the second guiding groove;
a flexible backplane disposed between the first housing fastening bracket and the second housing fastening bracket, comprising two ends, configured to cover the base, the first rotating assembly, the second rotating assembly, the first backplane support assembly, and the second backplane support assembly, and separately coupled to the first backplane support assembly and the second backplane support assembly,
wherein the first housing fastening bracket further comprises a first housing fastening bracket second side that faces the first backplane support assembly and a first housing fastening bracket third side proximate to the flexible backplane,
wherein the second housing fastening bracket further comprises a second housing fastening bracket second side that faces the second backplane support assembly and a second housing fastening bracket third side proximate to the flexible backplane;
a first accommodating cavity disposed on the first housing fastening bracket third side; and
a second accommodating cavity disposed on the second housing fastening bracket third side, and
wherein when the first housing fastening bracket and the second housing fastening bracket are folded relative to each other:
the first swing rod sliding block is configured to slide in the first guiding groove in a first direction away from the base;
the second swing rod sliding block is configured to slide in the second guiding groove in a second direction away from the base; and
the flexible backplane is configured to be folded; and
the two ends respectively extend into the first accommodating cavity and the second accommodating cavity.

11. An electronic device comprising:
a flexible display; and
a hinge mechanism coupled to the flexible display and comprising:
a base comprising a first base side that faces the flexible display and that has a base support surface;
at least one hinge assembly comprising:
a first rotating assembly comprising:
a first housing fastening bracket comprising a first housing fastening bracket first side that faces the flexible display and that has a first housing fastening bracket support surface; and
a first rotating element rotatably couples to the base and the first housing fastening bracket; and
a second rotating assembly comprising:
a second housing fastening bracket comprising a second housing fastening bracket first side that faces the flexible display and that has a second housing fastening bracket support surface; and
a second rotating element that rotatably couples to the base and the second housing fastening bracket,
wherein the first rotating assembly and the second rotating assembly are disposed opposite to each other on two sides of the base,
wherein the first housing fastening bracket support surface, the second housing fastening bracket support surface, and the base support surface are separately coupled to the flexible display and form:
a flat support surface for supporting the flexible display when the hinge mechanism is in a flattened state; and
a U-shaped support surface for supporting the flexible display when the hinge mechanism is in a folded state; and
a first hinge side, and
wherein the flexible display is disposed on the first hinge side and is coupled to the first housing fastening bracket support surface, the second housing fastening bracket support surface, and the base support surface;
a first sliding limiting assembly coupled between the first housing fastening bracket and the base and comprising:
a first limiting gear comprising:
a first limiting gear shaft disposed on the base; and
a first limiting gear body sleeved on the first limiting gear shaft; and
a first limiting gear swing rod comprising:
a first limiting sliding block comprising a first limiting sliding block end that faces the base; and
a first limiting gear part disposed at the first limiting sliding block end and configured to mesh with the first limiting gear body; and
a second sliding limiting assembly coupled between the second housing fastening bracket and the base and comprising:

a second limiting gear comprising:

a second limiting gear shaft disposed on the base; and a second limiting gear body sleeved on the second limiting gear shaft and configured to mesh with the first limiting gear body; and a second limiting gear swing rod comprising:

a second limiting sliding block comprising a second limiting sliding block end that faces the base; and a second limiting gear part disposed at the second limiting sliding block end and configured to mesh with the second limiting gear body.

12. The electronic device of claim 11, wherein the flexible display comprises a flexible display side, wherein the base further comprises:

a second base side that faces the first rotating element; and a third base side that faces the second rotating element, wherein the first housing fastening bracket further comprises a first housing fastening bracket second side that faces the first rotating element, wherein the second housing fastening bracket further comprises a second housing fastening bracket second side that faces the second rotating element, wherein the first rotating element comprises:

a first arc-shaped guiding groove disposed on the second base side;

a second arc-shaped guiding groove disposed on the first housing fastening bracket second side;

a first arc-shaped rotating block comprising a first concave surface disposed towards one side of the flexible display, accommodated in the first arc-shaped guiding groove, and configured to slide in the first arc-shaped guiding groove to implement a first rotatable connection between the first rotating element and the base, wherein the first arc-shaped rotating block and the first arc-shaped guiding groove have a first rotation center; and a second arc-shaped rotating block that are fastened to the first arc-shaped rotating block, comprising a second arc-shaped rotating block concave surface disposed towards the flexible display side, accommodated in the second arc-shaped guiding groove, and configured to slide in the second arc-shaped guiding groove to implement a second rotatable connection between the first rotating element and the first housing fastening bracket, wherein the second arc-shaped rotating block and the second arc-shaped guiding groove have a second rotation center, wherein the first rotation center and the second rotation center do not overlap, wherein the second rotating element comprises:

a third arc-shaped guiding groove disposed on the third base side;

a fourth arc-shaped guiding groove disposed on the second housing fastening bracket second side;

a third arc-shaped rotating block comprising a third concave surface disposed towards the flexible display side, accommodated in the third arc-shaped guiding groove, and configured to slide in the third arc-shaped guiding groove to implement a third rotatable connection between the second rotating element and the base, wherein the third arc-shaped rotating block and the third arc-shaped guiding groove have a third rotation center; and a fourth arc-shaped rotating block fastened to the third arc-shaped rotating block, comprising a fourth concave surface disposed towards the flexible display side, accommodated in the fourth arc-shaped guiding groove, and configured to slide in the fourth arc-shaped guiding groove to implement a fourth rotatable connection between the second rotating element and the second housing fastening bracket, wherein the fourth arc-shaped rotating block and the fourth arc-shaped guiding groove have a fourth rotation center, and wherein the third rotation center and the fourth rotation center do not overlap.

13. The electronic device of claim 12, wherein the first rotating element further comprises a first body comprising:

a first body first side located away from the flexible display, wherein the first arc-shaped rotating block and the second arc-shaped rotating block are disposed on the first body first side; and a first body second side that faces the flexible display and that has a first arc-shaped support surface configured to protrude toward the flexible display, wherein the second rotating element further comprises a second body comprising:

a second body first side located away from the flexible display, wherein the third arc-shaped rotating block and the fourth arc-shaped rotating block are disposed on the second body first side and a second body second side that faces the flexible display and that has a second arc-shaped support surface configured to protrude toward the flexible display, wherein when the hinge mechanism is in the flattened state:

a first part of the first arc-shaped support surface is located in the flat support surface and configured to abut against the flexible display; and a second part of the second arc-shaped support surface is located in the flat support surface and configured to abut against the flexible display, and wherein when the hinge mechanism is in the folded state, the first housing fastening bracket support surface, the first arc-shaped support surface, the base support surface, the second arc-shaped support surface, and the second housing fastening bracket support surface are configured to form the U-shaped support surface.

14. The electronic device of claim 13, wherein the first housing fastening bracket support surface comprises:

a first plane comprising a first plane side proximate to the first rotating element; and a first arc surface disposed on the first plane side extended in a first direction away from the flexible display; display, wherein the second housing fastening bracket support surface comprises:

a second plane comprising a second plane side proximate to the second rotating element; and a second arc surface disposed on the second plane side and extended in a second direction away from the flexible display, wherein the base support surface comprises:

a third plane comprising:

a third plane first side; and a third plane second side, a third arc surface located on the third plane first side, disposed proximate to the first rotating element, and extended in a third direction away from the flexible display; and a fourth arc surface located on the third plane second side, disposed proximate to the second rotating element, and extended in the third direction, wherein in a process in which the first housing fastening bracket and the second housing fastening bracket are folded or unfolded relative to each other:

the first arc surface and the third arc surface respectively configured to abut against two sides of the first arc-shaped support surface; and the second arc surface and the fourth arc surface respectively configured to abut against two sides of the second arc-shaped support surface, wherein when the hinge mechanism is in the flattened state, the first plane, a third part of the first arc-shaped support surface, the second plane, a fourth part of the second arc-shaped support surface, and the third plane are configured to form the flat support surface, and wherein when the hinge mechanism is in the folded state, the first plane, the first arc surface, the first arc-shaped support surface, the third arc surface, the third plane, the fourth arc surface, the second arc-shaped support surface, the second arc surface, and the second plane are configured to form the U-shaped support surface.

15. The electronic device of claim 11, wherein the first housing fastening bracket is disposed with a first limiting chute extending in a first direction away from the base, wherein the second housing fastening bracket is disposed with a second limiting chute extending in a second direction away from the base, wherein the first limiting sliding block is accommodated in the first limiting chute and configured to slide in the first limiting chute to restrict a first rotation direction of the first rotating assembly relative to the base, wherein the second limiting sliding block is accommodated in the second limiting chute, and wherein the second limiting sliding block end is configured to slide in the second limiting chute to restrict a second rotation direction of the second rotating assembly relative to the base.

16. The electronic device of claim 15, wherein the at least one hinge assembly further comprises:

a first damping assembly comprising:

a first spring comprising:

a first spring first end fastened to the first housing fastening bracket; and a first spring second end;

a first a first moving shaft coupled to the first spring second end; and a first roller sleeved on the first moving shaft, configured to rotate around the first moving shaft, and comprising a first roller peripheral side; and a second damping assembly comprising:

a second spring comprising:

a second spring first end fastened to the second housing fastening bracket; and a second spring second end;

a second moving shaft coupled to the second spring second end; and a second roller sleeved on the second moving shaft, configured to rotate around the second moving shaft, and comprising a second roller peripheral side, wherein the first limiting sliding block is disposed with a first limiting protrusion, configured to:

abut against the first roller peripheral side; and when the first limiting sliding block slides in the first limiting chute first;

push the first roller to rotate; and drive the first moving shaft to compress the first spring to make the first spring generate a first elastic force to dampened sliding of the first limiting sliding block, and wherein the second limiting sliding block is disposed with a second limiting protrusion configured to:

abut against the second roller peripheral side; and when the second limiting sliding block slides in the second limiting chute:

push the second roller to rotate; and drive the second moving shaft to compress the second spring to make the second spring generate a second elastic force to dampened sliding of the second limiting sliding block.

17. The electronic device of claim 15, wherein the at least one hinge assembly further comprises:

a first damping assembly comprising:

a first spring disposed on the base and comprising a first spring end;

a first damping cam disposed on the first spring end; and a second damping cam fastened to the first limiting gear part and configured to mesh with the first damping cam; and a second damping assembly comprising:

a second spring disposed on the base and comprising a second spring end;

a third damping cam disposed on the second spring end; and a fourth damping cam fastened to the second limiting gear part and configured to mesh with the third damping cam, wherein when the first limiting sliding block slides in the first limiting chute, the second damping cam is configured to push the first damping cam and compress the first spring to make the first spring generate a first elastic force to dampened sliding of the first limiting sliding block, and wherein when the second limiting sliding block des in the second limiting chute, the fourth damping cam is configured to push the third damping cam and compress the second spring to make the second spring generate a second elastic force to dampen sliding of the second limiting sliding block.

18. The electronic device of claim 11, further comprising:

a first backplane support assembly comprising:

a first sliding block disposed proximate to the first housing fastening bracket; and a first arc-shaped rotating block fastened to the first sliding block, disposed proximate to the base, and comprising a first arc-shaped rotating block concave surface disposed away from the flexible display; and a second backplane support assembly comprising:

a second sliding block disposed proximate to the second housing fastening bracket; and a second arc-shaped rotating block fastened to the second sliding block, disposed proximate to the base, and comprising a second arc-shaped rotating block concave surface disposed away from the flexible display, wherein the first housing fastening bracket further comprises a first housing fastening bracket second side proximate to the first backplane support assembly, wherein the second housing fastening bracket comprises a second housing fastening bracket second side proximate to the second backplane support assembly, wherein the base further comprises:

a second base side proximate to the first backplane support assembly; and a third base side proximate to the second backplane support assembly;
a first guiding groove disposed on the first housing fastening bracket second side and comprising a first guiding groove end that is located away from the base and that extends along the flexible display;
a second guiding groove disposed on the second housing fastening bracket second side and comprising a second guiding groove end that is located away from the base and that extends along the flexible display;
a first arc-shaped guiding groove disposed on the second base side;
a second arc-shaped guiding groove disposed on the third base side,
wherein the first sliding block is accommodated in the first guiding groove and configured to slide in the first guiding groove to implement a first sliding connection between the first backplane support assembly and the first housing fastening bracket;
wherein the first arc-shaped rotating block is accommodated in the first arc-shaped guiding groove and configured to slide in the fifth first arc-shaped guiding groove to implement a first rotatable connection between the first backplane support assembly and the base,
wherein the second sliding block is accommodated in the second guiding groove and configured to slide in the second guiding groove to implement a second sliding connection between the second backplane support assembly and the second housing fastening bracket,
wherein the second arc-shaped rotating block is accommodated in the second arc-shaped guiding groove and configured to slide in the second arc-shaped guiding groove to implement a second rotatable connection between the second backplane support assembly and the base; and
a flexible backplane is disposed between the first housing fastening bracket and the second housing fastening bracket, comprising two ends, configured to cover the base, the first rotating assembly, the second rotating assembly, the first backplane support assembly, and the second backplane support assembly, and separately coupled to the first backplane support assembly and the second backplane support assembly,
wherein the first housing fastening bracket further comprises a first housing fastening bracket third side proximate to the flexible backplane,
wherein the second housing fastening bracket further comprises a second housing fastening bracket third side proximate to the flexible backplane;
a first accommodating cavity disposed on the first housing fastening bracket third side; and
a second accommodating cavity disposed on the second housing fastening bracket third side, and
wherein when the first housing fastening bracket and the second housing fastening bracket are folded relative to each other:
the first sliding block is configured to slide in the first guiding groove in a first direction away from the base;
the first arc-shaped rotating block is configured to slide in the first arc-shaped guiding groove in a second direction away from the base;
the second sliding block is configured to slide in the second guiding groove in a third direction away from the base;
the second arc-shaped rotating block is configured to slide in the second arc-shaped guiding groove in a fourth direction away from the base; and
the flexible backplane is configured to be folded and the two ends respectively extend into the first accommodating cavity and the second accommodating cavity.

19. The electronic device of claim 18, wherein the flexible backplane comprises a flexible backplane side that faces the flexible display and that comprises a first surface, and wherein the first backplane support assembly further comprises a first support plate comprising:
a first support plate first side that faces the flexible display, wherein the first sliding block and the fifth first arc-shaped rotating block are disposed on the first support plate side; and
a first support plate second side that is located away from the flexible display, wherein the flexible backplane is coupled to the first support plate second side,
wherein the second backplane support assembly further comprises a second support plate comprising:
a second support plate first side that faces the flexible display, wherein the second sliding block and the second arc-shaped rotating block are disposed on the second support plate side; and
a second support plate second side that is located away from the flexible display, wherein the flexible backplane is coupled to the second support plate second side, and
wherein the hinge mechanism further comprises a blind hole structure disposed on the first surface and located between the first support plate and the second support plate.

20. The electronic device of claim 11, further comprising:
a first backplane support assembly comprising:
a first rotating gear comprising:
a first rotating gear shaft disposed on the base; and
a first rotating gear body sleeved on the first rotating gear shaft; and
a first rotating gear swing rod comprising:
a first swing rod sliding block comprising a first swing rod sliding block end that faces the base; and
a first swing rod gear part disposed at the first swing rod sliding block end and configured to mesh with the first rotating gear body,
wherein the first housing fastening bracket further comprises a first housing fastening bracket second side that faces the first backplane support assembly;
a first guiding groove disposed on the first housing fastening bracket second side and comprising a first guiding groove end that is located away from the base and that extends along the flexible display, and wherein the first swing rod sliding block is accommodated in the first guiding groove;
a second backplane support assembly comprising:
a second rotating gear comprising:
a second rotating gear shaft disposed on the base; and
a second rotating gear body sleeved on the second rotating gear shaft; and
a second rotating gear swing rod comprising:
a second swing rod sliding block comprising a second swing rod sliding block end that faces the base; and a second swing rod gear part disposed at the second swing rod sliding block end and configured to mesh with the second rotating gear body, a second guiding groove disposed on the second housing fastening bracket second side and comprising a second guiding groove end that is located away from the base and that extends along the flexible display, and wherein the second swing rod sliding block is accommodated in the second guiding groove;

a flexible backplane is disposed between the first housing fastening bracket and the second housing fastening bracket, comprising two ends, configured to cover the base, the first rotating assembly, the second rotating assembly, the first backplane support assembly, and the second backplane support assembly, and separately coupled to the first backplane support assembly and the second backplane support assembly, a first accommodating cavity disposed on the first housing fastening bracket third side; and a second accommodating cavity disposed on the second housing fastening bracket third side, and wherein the first housing fastening bracket further comprises a first housing fastening bracket third side proximate to the flexible backplane, wherein the second housing fastening bracket further comprises a second housing fastening bracket second side that faces the second backplane support assembly and a second housing fastening bracket third side proximate to the flexible backplane;

wherein when the first housing fastening bracket and the second housing fastening bracket are folded relative to each other:

the first swing rod sliding block is configured to slide in the first guiding groove in a first direction away from the base;

the second swing rod sliding block is configured to slide in the second guiding groove in a second direction away from the base; and the flexible backplane is configured to be folded and the two ends respectively extend into the first accommodating cavity and the second accommodating cavity.

* * * * *